United States Patent
Yonezawa et al.

(10) Patent No.: US 7,880,450 B2
(45) Date of Patent: Feb. 1, 2011

(54) SWITCHING POWER SUPPLY, CONTROL CIRCUIT CONTROLLING SWITCHING POWER SUPPLY AND CONTROL METHOD OF SWITCHING POWER SUPPLY

(75) Inventors: Yu Yonezawa, Kawasaki (JP); Naoyuki Mishima, Yokohama (JP)

(73) Assignee: Taiyo Yuden Mobile Technology Co., Ltd., Yokohama (JP)

( * ) Notice: Subject to any disclaimer, the term of this patent is extended or adjusted under 35 U.S.C. 154(b) by 0 days.

(21) Appl. No.: 12/777,711

(22) Filed: May 11, 2010

(65) Prior Publication Data

US 2010/0219801 A1 Sep. 2, 2010

Related U.S. Application Data

(63) Continuation of application No. PCT/JP2007/072219, filed on Nov. 15, 2007.

(51) Int. Cl.
*G05F 1/613* (2006.01)
*G05F 1/618* (2006.01)
*G05F 1/24* (2006.01)
*H02H 7/122* (2006.01)

(52) U.S. Cl. ............. 323/229; 323/259; 363/56.12
(58) Field of Classification Search ........... 323/222, 323/225, 259, 282; 363/56.12
See application file for complete search history.

(56) References Cited

U.S. PATENT DOCUMENTS

| | | | | |
|---|---|---|---|---|
| 5,637,988 | A * | 6/1997 | Gucyski | 323/222 |
| 6,462,962 | B1 * | 10/2002 | Cuk | 363/16 |
| 6,784,644 | B2 * | 8/2004 | Xu et al. | 323/225 |
| 7,321,224 | B2 * | 1/2008 | Iwamoto et al. | 323/262 |
| 2008/0094866 | A1 * | 4/2008 | Bauman et al. | 363/50 |
| 2008/0169792 | A1 * | 7/2008 | Orr | 323/222 |

FOREIGN PATENT DOCUMENTS

| | | |
|---|---|---|
| JP | 63-124767 | 5/1988 |
| JP | 7-123707 | 5/1995 |
| JP | 7-241071 | 9/1995 |

(Continued)

OTHER PUBLICATIONS

John G. Kassakian, "Principles of Power Electronics," Addison-Wesley Publishing Company, 1992, pp. 680-687.

(Continued)

*Primary Examiner*—Bao Q Vu
*Assistant Examiner*—Jue Zhang
(74) *Attorney, Agent, or Firm*—Staas & Halsey LLP

(57) ABSTRACT

A switching power supply includes: a first switch provided between one end of a DC power supply and one end of a load; a second switch provided between a node of the first switch located on a load side and another end of the DC power supply; a capacitor provided between the second switch and the another end of the DC power supply; a third switch provided between a node of the first switch located on a DC power supply side and a node between the second switch and the capacitor; and a delay circuit that is provided between the third switch and the node between the second switch and the capacitor and delays a current for charging the capacitor, wherein the second switch is turned on in a period during which the first switch is kept on.

11 Claims, 22 Drawing Sheets

FOREIGN PATENT DOCUMENTS

| | | |
|---|---|---|
| JP | 2000-262046 | 9/2000 |
| JP | 2007-82332 | 3/2007 |

OTHER PUBLICATIONS

John G. Kassakian, "Principles of Power Electronics," Addison-Wesley Publishing Company, 1992, pp. 674-679.

Ahmed Elasser, "Soft Switching Active Snubbers for DC/DC Converters," IEEE Transaction on Power Electronics, vol. 11, Issue 5, 1996, pp. 710-722.

English language International Search Report, PCT/ISA/210, for PCT/JP2007/072219, mailed on Jan. 29, 2008.

* cited by examiner

US 7,880,450 B2

SWITCHING POWER SUPPLY, CONTROL CIRCUIT CONTROLLING SWITCHING POWER SUPPLY AND CONTROL METHOD OF SWITCHING POWER SUPPLY

CROSS REFERENCE TO RELATED APPLICATION

This application is a continuation application of PCT/JP2007/072219, filed Nov. 15, 2007.

FIELD

The present invention relates to a switching power supply, a control circuit for controlling a switching power supply, and a control method of switching power supply.

BACKGROUND

For example, a step-down type of DC-DC converter is used in information equipment. Such a DC-DC converter employs a switching power supply using a switch. A buck type power supply circuit is used in a case where ground in input and that in output are commonly used (see Non-Patent Document 1). A power supply circuit having a snubber circuit is used in order to suppress power consumed at the time of turning on/off of a main switch (see Non-Patent Document 1 and Non-Patent Document 2).

[Non-Patent Document 1] John G Kassakian, Principles of power electronics, ADDISON-WESLEY PUBLISHING COMPANY, 1992, pp 674-687

[Non-Patent Document 2] IEEE Transaction on Power Electronics, Vol. 11, Issue. 5, 1996, pp 710-722

SUMMARY

According to an aspect of the present invention, there is provided a switching power supply including: a first switch provided between one end of a DC power supply and one end of a load; a second switch provided between a node of the first switch located on a load side and another end of the DC power supply; a capacitor provided between the second switch and the another end of the DC power supply; a third switch provided between a node of the first switch located on a DC power supply side and a node between the second switch and the capacitor; and a delay circuit that is provided between the third switch and the node between the second switch and the capacitor and delays a current for charging the capacitor, wherein the second switch is turned on in a period during which the first switch is kept on.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
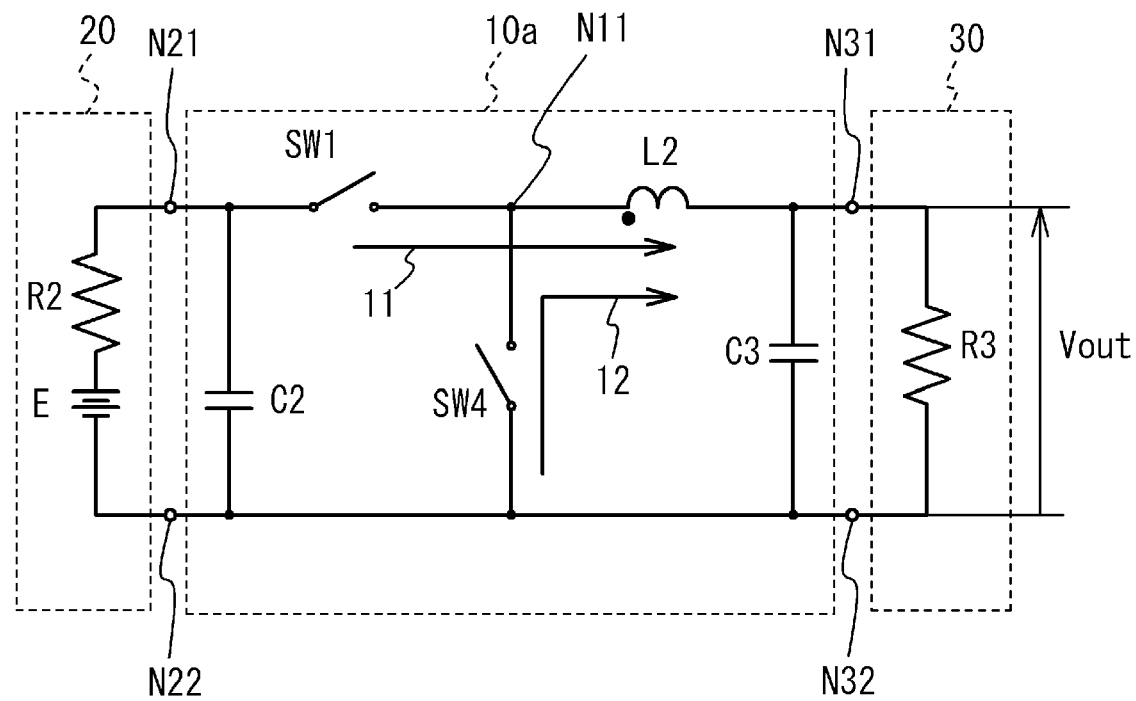
FIG. 1 is a circuit diagram of a switching power supply in accordance with a comparative example 1.

First, a problem to be solved by the invention is described. FIG. 1 is a circuit diagram of a buck type switching power supply in accordance with a comparative example 1. Referring to FIG. 1, a DC power supply 20 and a load 30 are connected to a switching power supply 10a. The DC power supply 20 is made up of a power source E and an internal resistance R2. The load 30 is formed by a resistor R3 in equivalent circuit. A positive terminal of the DC power supply 20 is connected to a node N21, and a negative terminal thereof is connected to a node N22. The positive terminal of the load 30 is connected to a node N31, and a negative terminal thereof is connected to a node N32. The nodes N22 and N32 are ground terminals and are directly connected to each other.

The switching power supply 10a has a first switch SW1, a fourth switch SW4, a capacitor C2, a capacitor C3 and a second inductor L2. The first switch SW1 is a main switch and is provided between the nodes N21 and N31. A second inductor L2 is connected to a load side of the first switch SW1. A node between the first switch SW1 and the second inductor L2 is N11. The fourth switch SW4 is a synchronous rectification switch, and is connected between the node N11 and the node N22. The capacitor C2 is an input smoothing capacitor, and is connected between the node N21 and the node N22. The capacitor C3 is an output smoothing capacitor, and is connected between the node N31 and the node N32.

Figure 2:
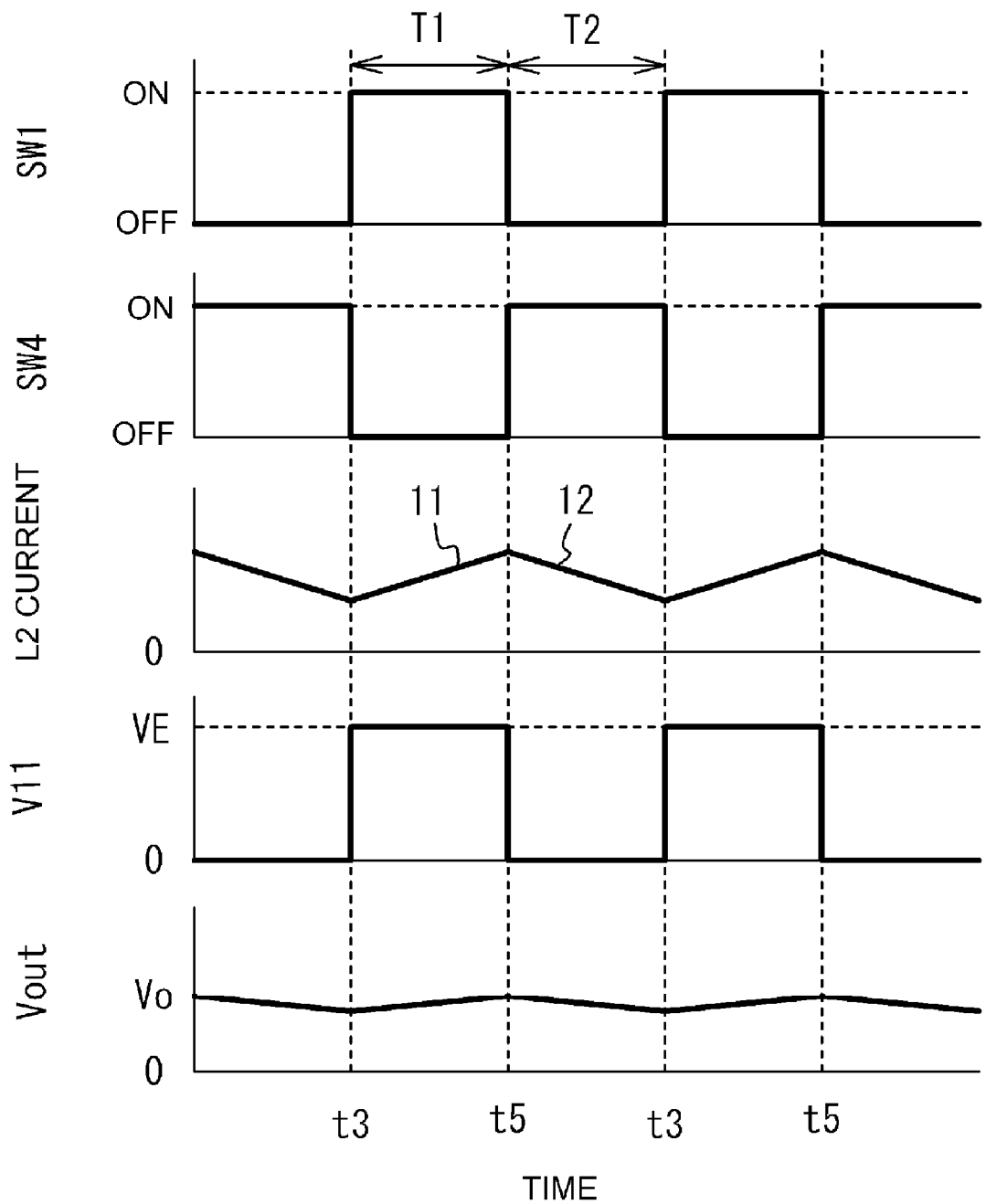
FIG. 2 is a diagram illustrating an operation of the comparative example 1.

An operation of the switching power supply in accordance with the first comparative example will now be described with reference to FIG. 2. FIG. 2 is a diagram that illustrates an operation of the first switch SW1, an operation of the fourth switch SW4, current that flows through the second inductor L2 (L2 current), a voltage V11 of the node N11, and an output voltage Vout of the node N31 with respect to the node N32 with time. The L2 current is positive in the flow from the node N11 to the node N31.

Referring to FIG. 2, during a period T1 between time t3 and time t5, the first switch SW1 is kept on, and the fourth switch SW4 is kept off. Thus, the node N11 has a voltage VE of the DC power supply 20. As indicated as a current 11 illustrated in FIG. 1, the current 11 flows from the node N21 to the node N31 via the first switch SW1, the node N11 and the second inductor L2. Due to the second inductor L2, the current I1 increases gradually.

During a period T2 between time t5 and time t3, the first switch SW1 is kept off, and the fourth switch SW4 is kept on. Thus, the node N11 is at the ground voltage 0. As indicated as a current 12 in FIG. 1, the current 12 flows from the node N32 to the node N31 via the fourth switch SW4, the node N11 and the second inductor L2. Due to the second inductor L2, the current 11 decreases gradually. The output voltage Vout of the node N31 is a voltage V0, which is lower than the voltage VE of the DC power supply 20, and is almost constant.

Figure 3:
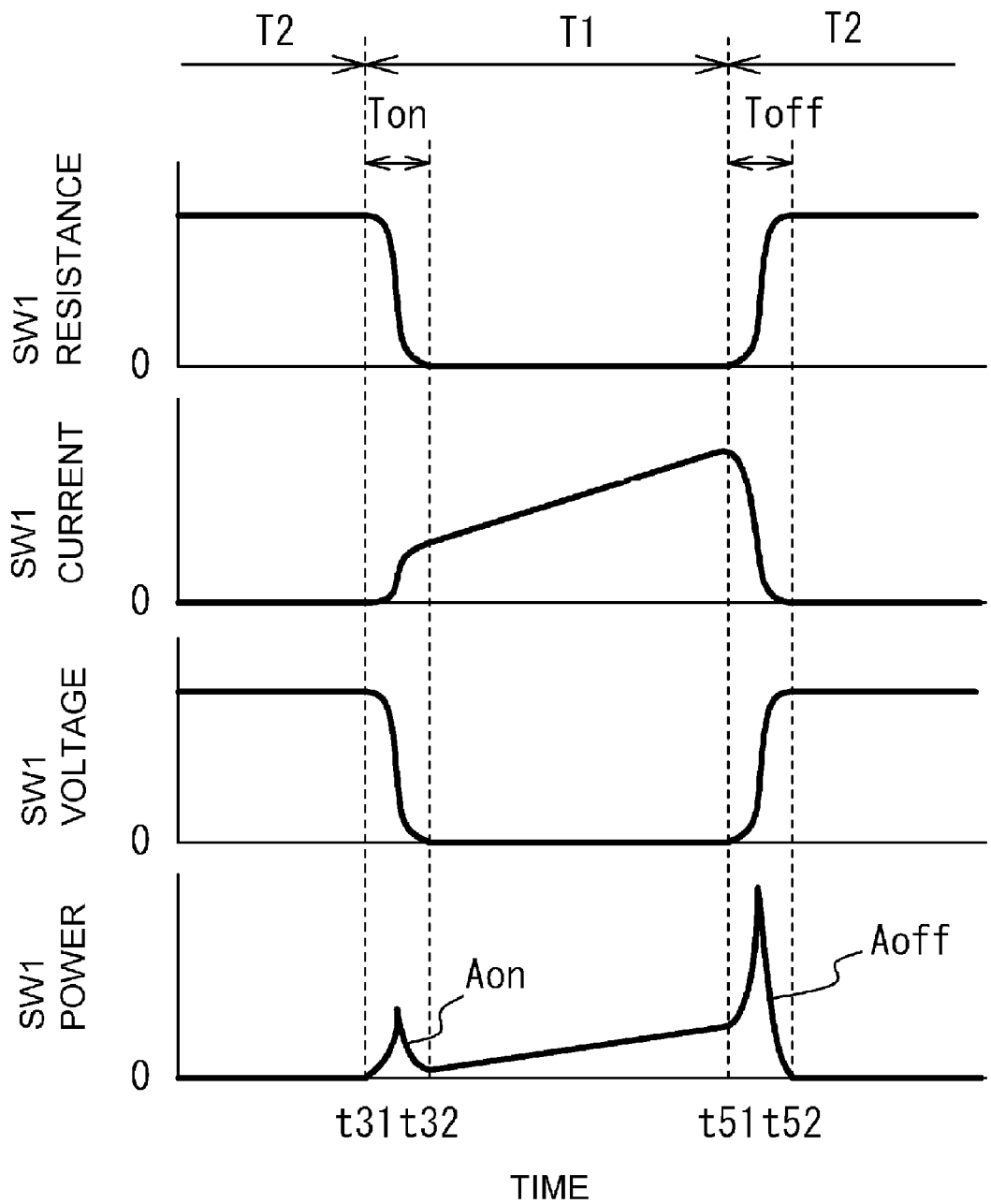
FIG. 3 is a diagram that illustrates power consumption of a first switch in the comparative example 1.

FIG. 3 is a diagram that describes power consumption that takes place in the first switch SW1 when the first switch SW1 is turned on and is turned off in the switching power supply in accordance with the comparative example 1. FIG. 3 is a diagram that illustrates the resistance of the first switch SW1 (SW1 resistance), current that flows through the first switch (SW1 voltage), power consumed by the first switch SW1 (SW1 power) with time. The SW1 current is positive in the flow from the node N21 to the node N11.

A turn-on period Ton between time t31 and time t32 is a transitional period from the period T2 to the period T1 and a turn-off period Toff between time t51 and time t52 is a transitional period from the period T1 to the period T2. During the period T2, the first switch SW1 is kept off and has a large SW1 resistance. The SW1 current is small, and the SW1 voltage is high. Since the SW1 current is small, the SW1 power is small.

At time t31, the first switch SW1 is turned on. During the turn-on period Ton, the SW1 resistance decreases gradually, and becomes almost zero at time t32. Thus, the SW1 current gradually increases from almost zero. The SW1 voltage decreases gradually, and becomes almost zero at time t32. The SW1 power has a maximum value in the turn-on period Ton. At time t32, the first switch SW1 is turned on, and thus, the SW resistance is almost zero. The SW1 current increases gradually during the period T1 due to the aforementioned second inductor L1. The SW1 voltage is almost zero. Although the SW1 voltage is almost zero, the SW1 current increases gradually, and accordingly, the SW1 power increases gradually.

At time t51, the first switch SW1 is turned off. During the turn-off period Toff, the SW1 resistance increases gradually and becomes constant at time t52. The SW1 current decreases gradually and becomes almost zero at time t52. The SW1 voltage increases gradually and becomes constant at time t52. The SW1 power has a maximum value in the turn-off period Toff. Since the SW1 current has the maximum at time t51, the maximum value Aoff of the SW1 power in the turn-off period Toff is greater than the maximum value Aon of the SW1 power in the turn-on period Ton.

As described above, in the buck type switching power supply indicated as the comparative example 1, power consumed by the first switch SW1 increases during the turn-off period Toff. Particularly, in a case where a semiconductor switch such as a MOSFET is used, the switching power supply may generate heat due to power consumed by the first switch SW1 because the turn-on period Ton and the turn-off period Toff are long. Further, the switching power supply that operates at high frequencies has an increased number of times of turning on and off, and further generates heat.

Figure 4:
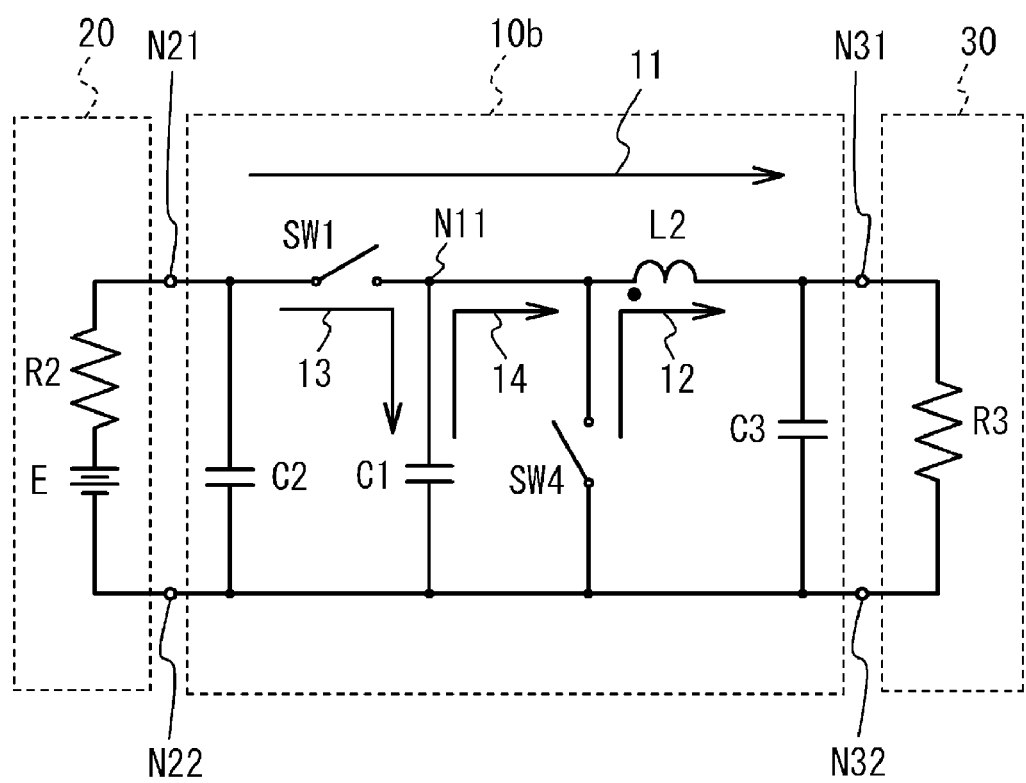
FIG. 4 is a circuit diagram of a switching power supply in accordance with a comparative example 2.

A comparative example 2 (see page 674 of Non-Patent Document 1) is an example that is directed to suppressing the SW1 power during the turn-off period Toff and is equipped with snubber capacitor. FIG. 4 is a circuit diagram of the switching power supply in accordance with the comparative example 2. A switching power supply 10b has a snubber capacitor C1 between the node N11 and the node N22. The other structures are the same as those of the comparative example 1 depicted in FIG. 1.

Figure 5:
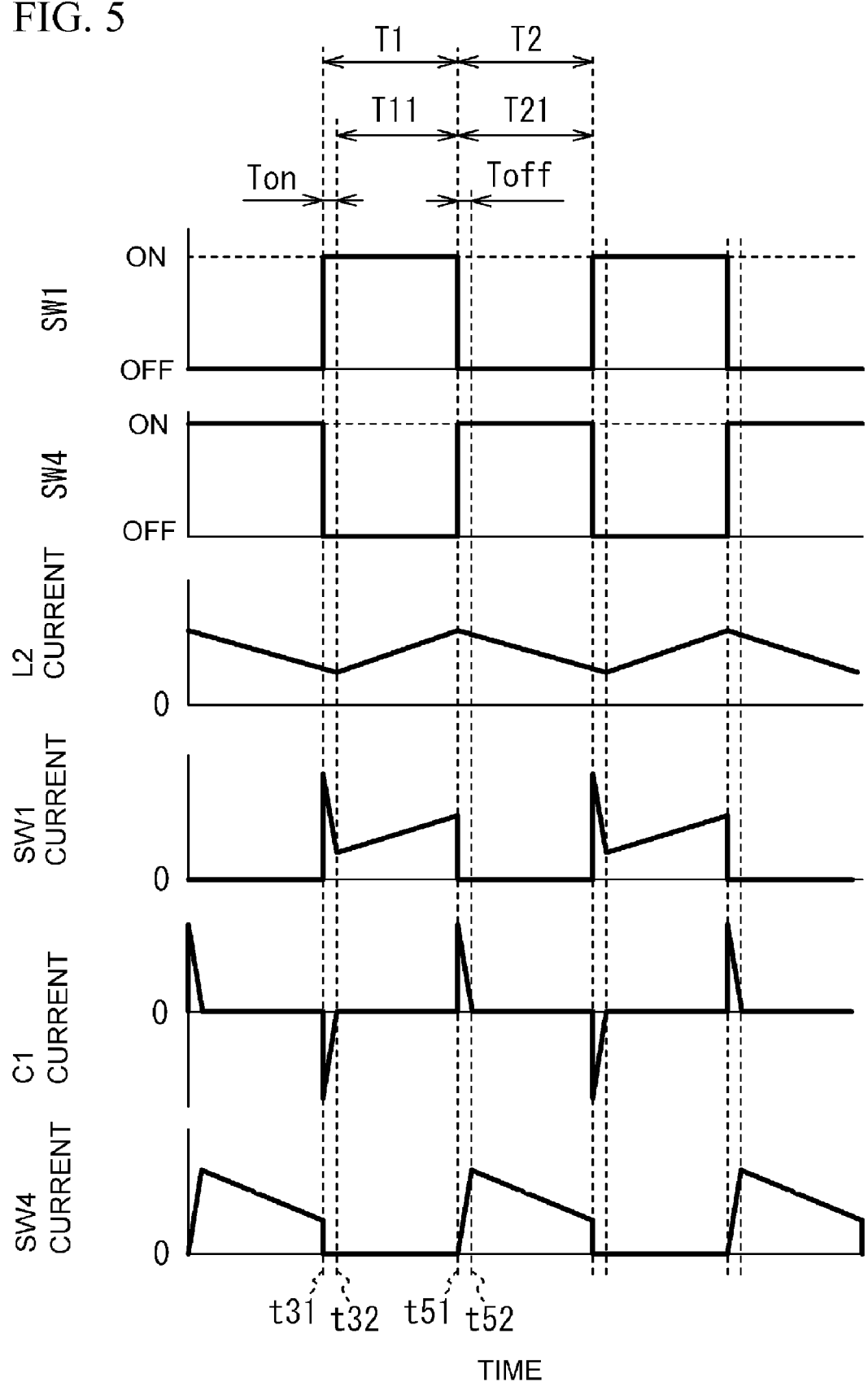
FIG. 5 is a diagram that illustrates an operation of the comparative example 2.

A description will be given, with reference to FIG. 5, of an operation of the switching power supply in accordance with the comparative example 2. FIG. 5 is a diagram that illustrates an operation of the first switch SW1, an operation of the fourth switch SW4, the L2 current, the SW1 current, current that flows through the first capacitor C1 (C1 current), and the SW4 current with time.

Referring to FIG. 5, the operations of the first switch SW1 and the fourth switch SW4 are the same as those of the comparative example 1 illustrated in FIG. 3. During the turn-on period Ton, as indicated as a current 13 in FIG. 4, the current 13 flows so as to charge the capacitor C1. During a period T11 from time t32 to t51 in FIG. 5, the current 11 flows as in the case of the period T1 of the comparative example 1 (see FIG. 4). Referring to FIG. 5, during the turn-off period Toff, as depicted as a current 14 in FIG. 4, the current 14 flows so as to discharge the capacitor C1. During a period D21 from time t52 to time t31 in FIG. 5, the current 12 flows as in the case of the period T2 in the comparative example 1 (see FIG. 4).

Figure 6:
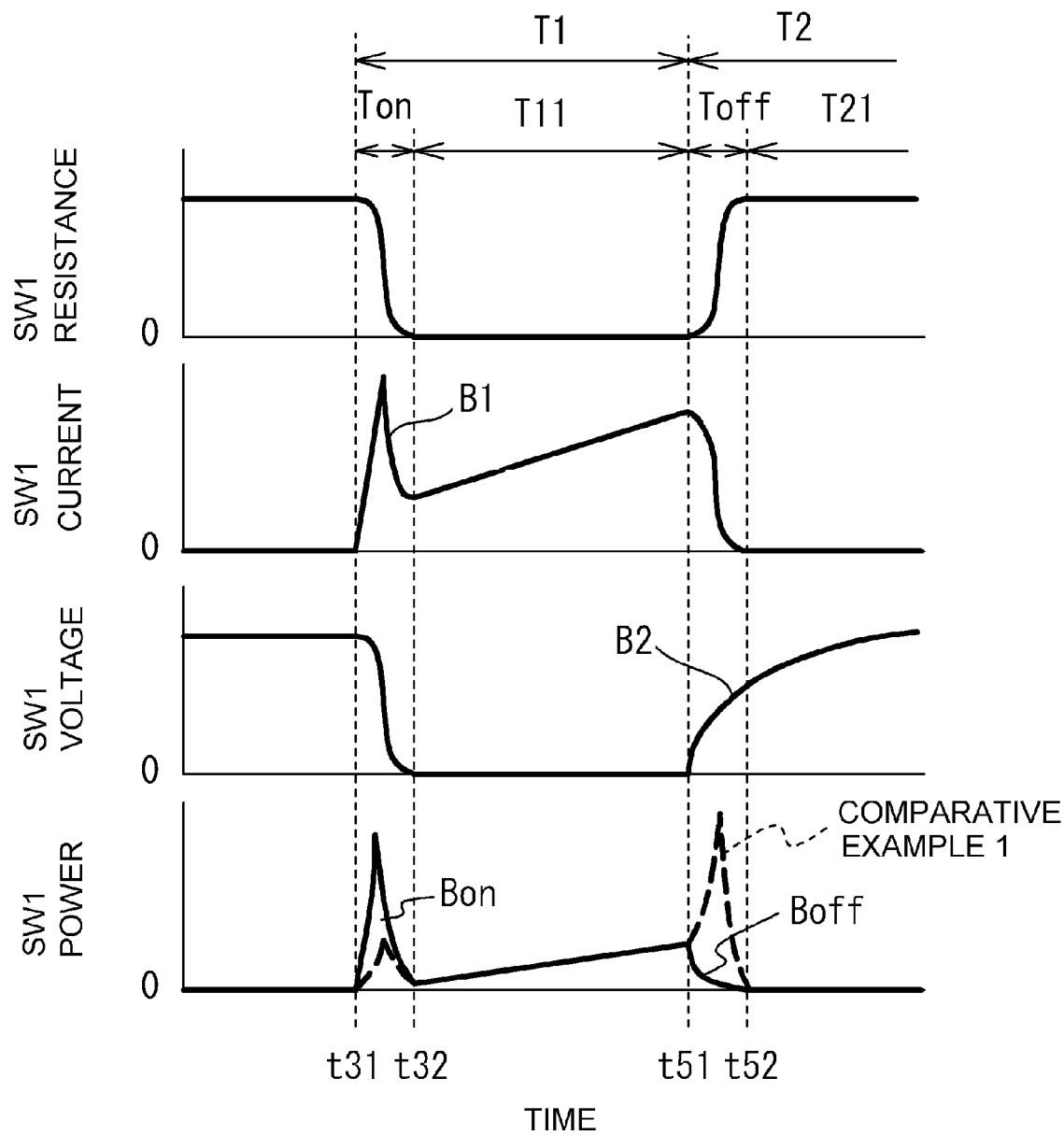
FIG. 6 is a diagram that illustrates power consumption of the first switch in accordance with the comparative example 2.

FIG. 6 is a diagram that describes power consumption of the switching power supply in accordance with the comparative example 2, and is similar to FIG. 3. A broken line of the SW1 power indicates the comparative example 1. During the turn-on period Ton, the SW1 current flows as a charge current for the capacitor C1 (see B1 in FIG. 6). Thus, the SW1 power Bon is larger than that in the comparative example 1. During the turn-off period Toff, due to the discharge from the capacitor C1, the voltage of the node N11 drops. Thus, the SW1 voltage rises gently to the period T21 (see B2 in FIG. 6). Thus, the rise of the SW1 power Boff is less than that in the comparative example 1. As described above, the comparative example 1 may suppress the rise of power during the turn-off period Toff, while power during the turn-on period increases.

Figure 7:
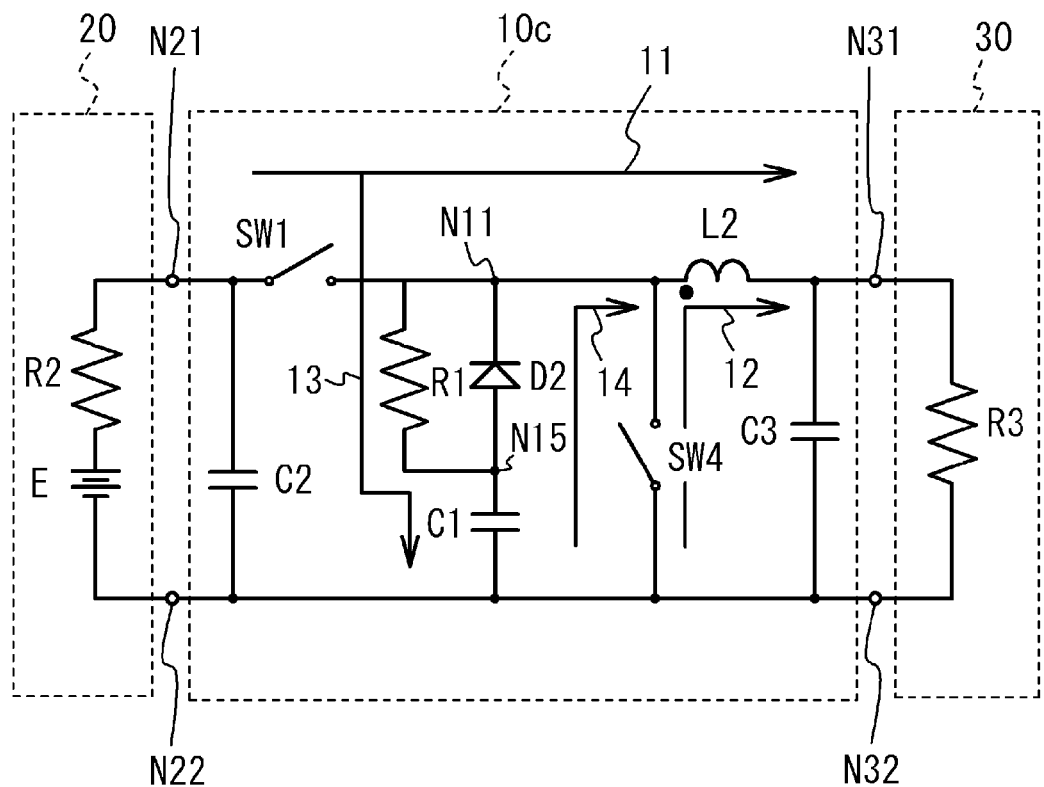
FIG. 7 is a circuit diagram of a switching power supply in accordance with a comparative example 3.

A comparative example 3 (see page 676 of Non-Patent Document 1) is an example directed to suppressing the SW1 power during the turn-off period Toff, and is an exemplary RCD snubber circuit. FIG. 7 is a circuit diagram of a switching power supply in accordance with the comparative example 3. Referring to FIG. 7, as compared to FIG. 4 of the comparative example 2, a switching power supply 10c is configured so that a second diode D2 and a resistor R1 are connected in parallel between the node N11 and the snubber capacitor C1. The other structures are the same as those of the comparative example 2 in FIG. 4 and a description thereof is omitted.

Figure 8:
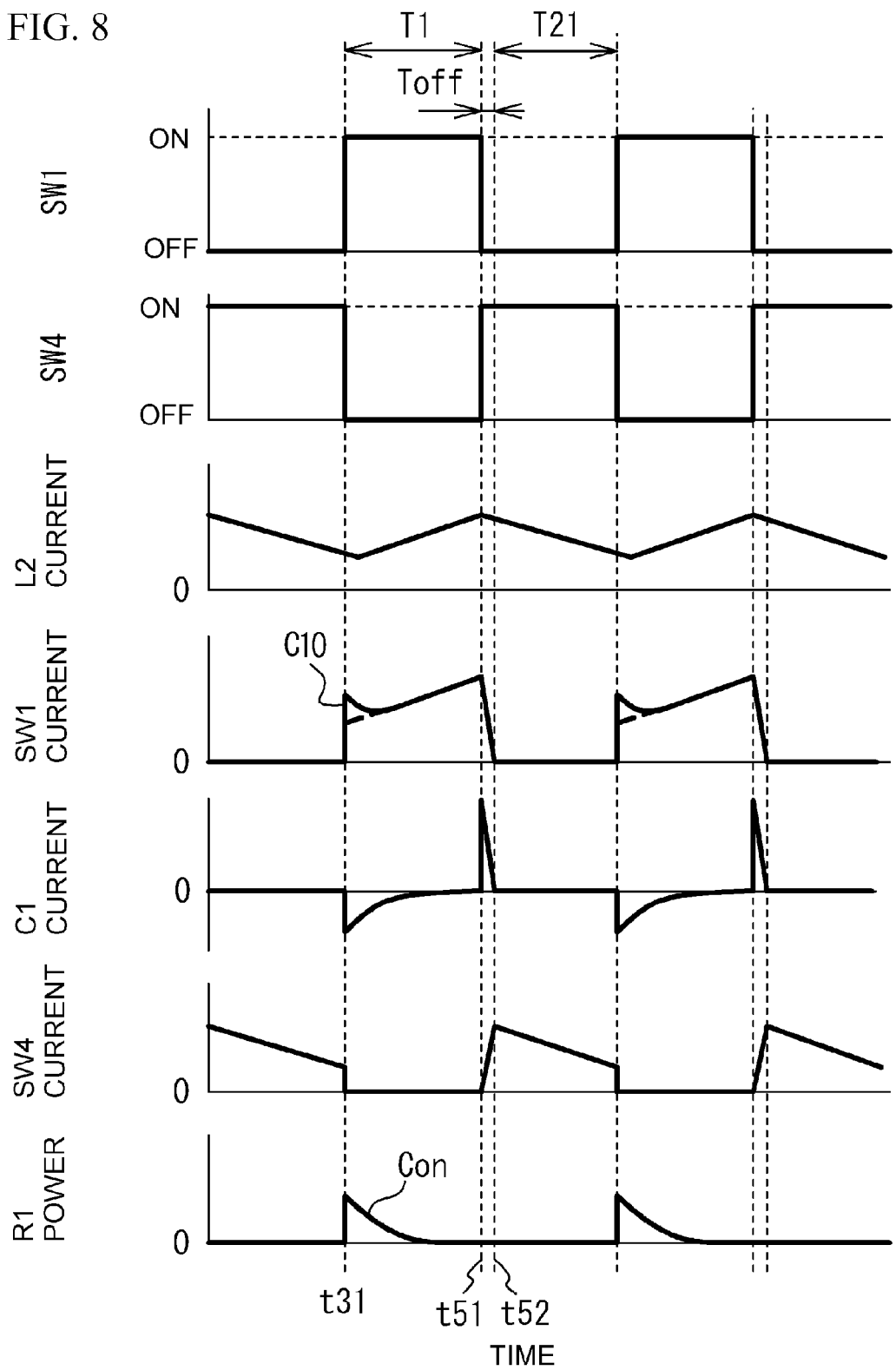
FIG. 8 is a diagram that illustrates an operation of the comparative example 3.

A description will now be given, with reference to FIG. 8, of an operation of a switching power supply in accordance with the comparative example 3. FIG. 8 is a diagram that illustrates an operation of the first switch SW1, an operation of the fourth switch SW4, the L2 current, the SW1 current, the C1 current, the SW4 current and power consumed by the resistor R1 (R1 power) with time.

Referring to FIG. 8, the operations of the first switch SW1 and the fourth switch SW4 are the same as those of the comparative example 2 illustrated in FIG. 5. At time t31, the first switch SW1 is turned on, and the current 13 that charges the capacitor C1 flows through the resistor R1. Thus, the maximum values of the SW1 current and the C1 current are reduced, and the period of time during which the current 13 flows is elongated (see C10 in FIG. 8). Thus, the currents 11 and 13 flow in parallel. In FIG. 8, a broken line corresponds to the current 11 out of the SW1 current, and current between the broken line and the solid line corresponds to the current 13. Thus, the first switch SW1 power during the turn-on period To is reduced. However, as illustrated in FIG. 8, the R1 power is developed (see Con in FIG. 8). There is a possibility that the charge of the capacitor C1 may not gain on if the switching cycle becomes short.

Figure 9:
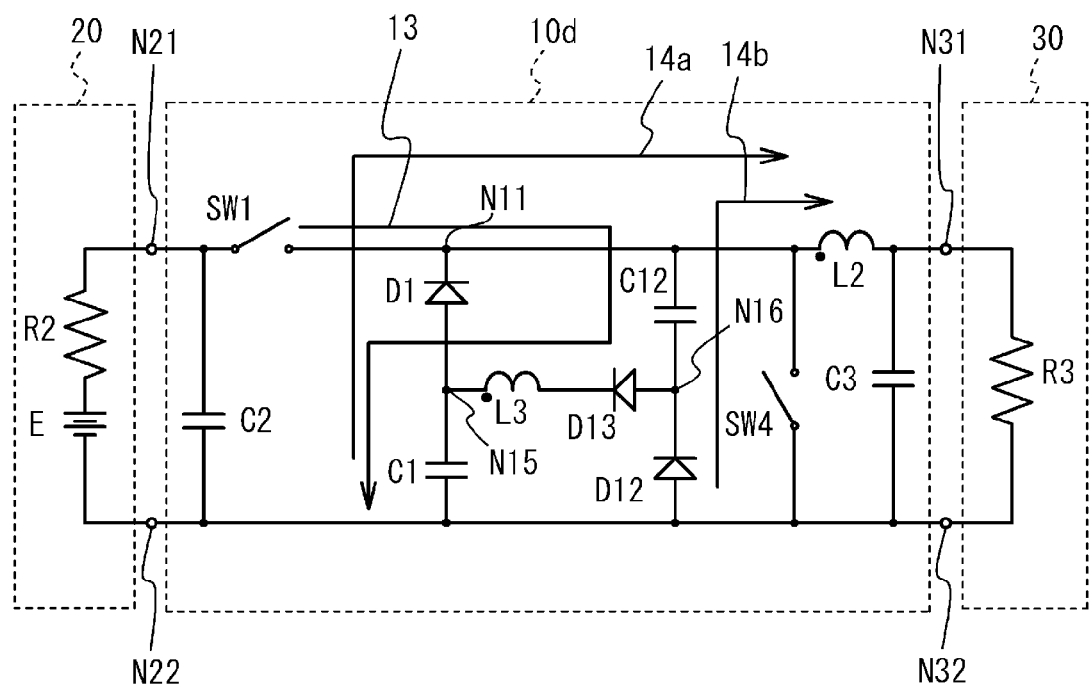
FIG. 9 is a circuit diagram of a switching power supply in accordance with a comparative example 4.

A comparative example 4 (see page 687 of Non-Patent Document 1) is an example directed to suppressing power consumed by the resistor. FIG. 9 is a circuit diagram of a switching power supply in accordance with the comparative example 4. As compared to FIG. 7 related to the comparative example 3, a switching power supply 10d is not provided with the resistor R1. A capacitor C12 and a diode D12 are connected between the node N11 and the node N22. An inductor L3 and a diode D13 are connected between a node N15 between a diode D1 and the capacitor C1 and a node N16 between the capacitor C12 and the diode D12. When the first switch SW1 is turned on, the current 13 flows to charge the capacitors C1 and C12 due to the resonance of the capacitors C1 and C12 and the inductor L3. The resonance ends with a half cycle due to the diode D13. The charges stored in the capacitors C1 and C12 stored in the capacitors C1 and C12 are released as currents 14a and 14b when the first switch SW1 is turned off. In the comparative example 4, the current 13 is not consumed by the resistor, and power consumption is thus small. Since the capacitors C1 and C12 are charged due to the resonance, the maximum value of the first switch SW1 current may be suppressed.

However, the current 13 that charges the capacitors C1 and C12 flow via the first switch SW1. Thus, power loss is developed due to the on-state resistance of the first switch SW1. As the switching cycle becomes short, the charge of the capacitors C1 and C12 may not gain on.

A description will now be given of embodiments that solve the problems of the comparative examples 1 through 4 with reference to the drawings.

First Embodiment

Figure 10:
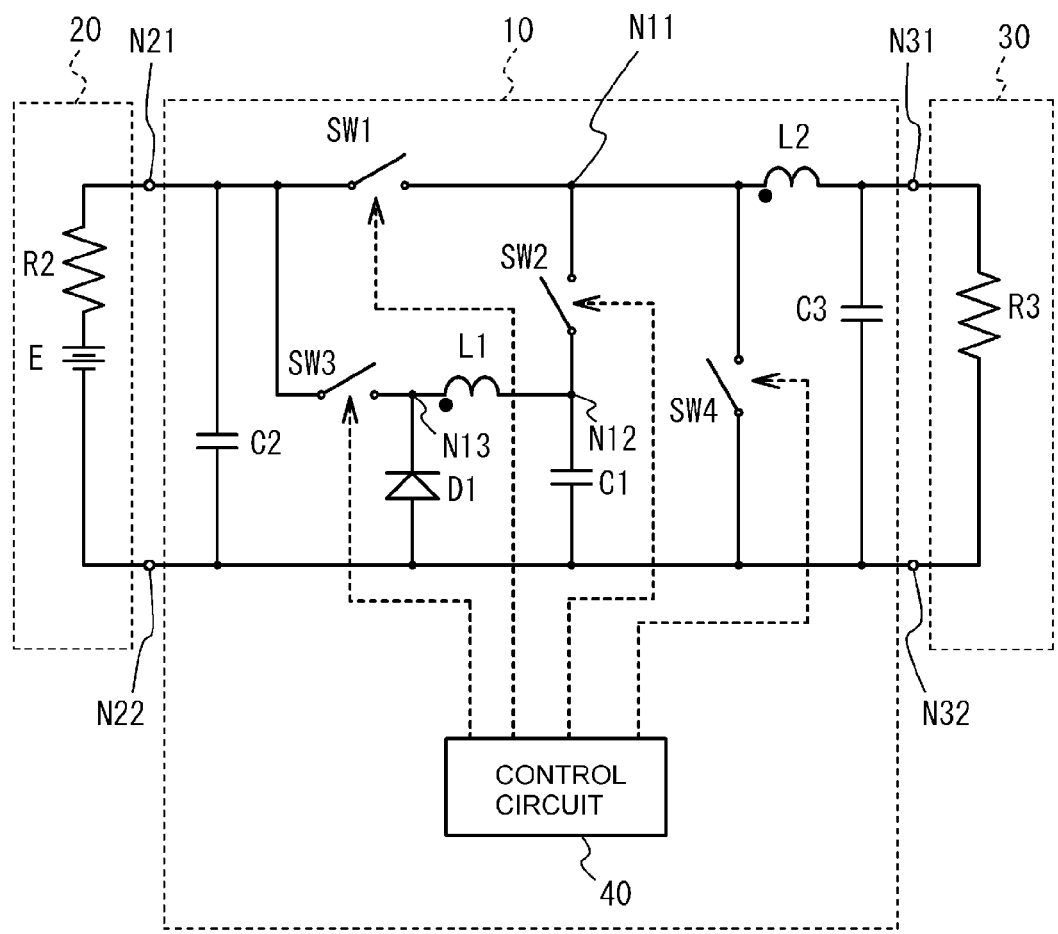
FIG. 10 is a circuit diagram of a switching power supply in accordance with example 1.

FIG. 10 is a circuit diagram of a switching power supply in accordance with an embodiment 1. As compared to the switching power supply 10b of the comparative example 2 in FIG. 4, a second switch SW2 is provided between the capacitor C1 and the node N11. A third switch SW3 and the inductor L1 are provided between a node N12 between the second switch SW2 and the capacitor C1 and the node N21. The first diode D1 is connected between a node N13 between the third switch SW3 and the inductor L1 and the node N22. There is provided a control circuit 40 that controls the switching operations of the switches SW1 through SW4. The other structures are the same as those of the embodiment 2 in FIG. 4 and a description thereof is omitted.

Figure 11:
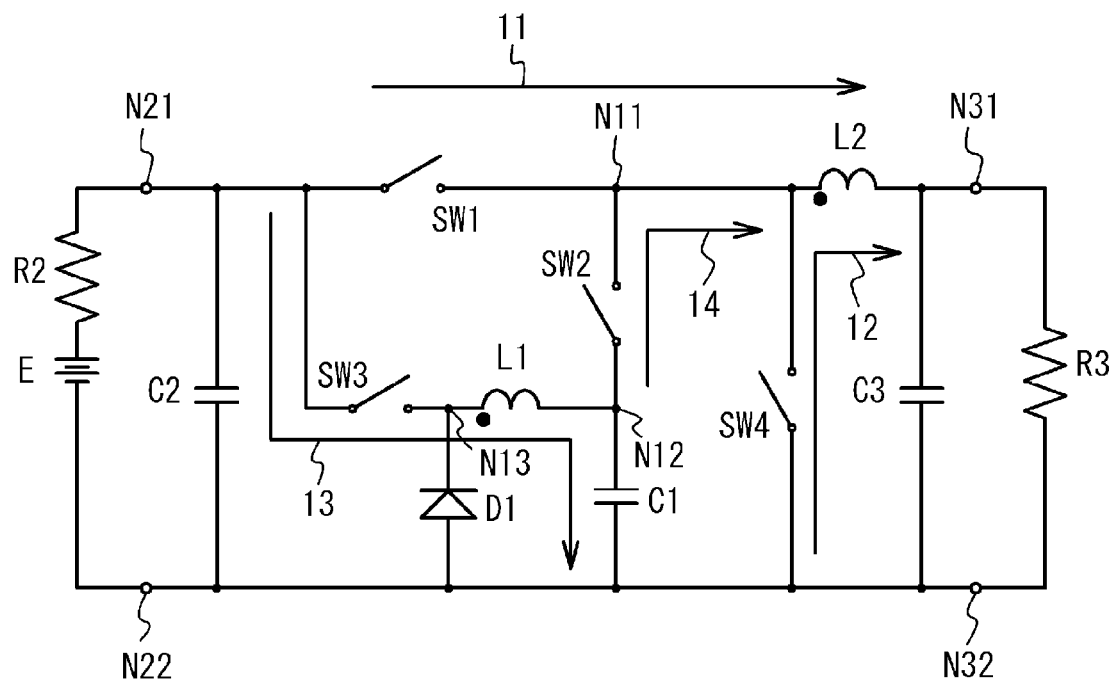
FIG. 11 is a diagram that illustrates currents that flow in the embodiment 1.
Figure 12:
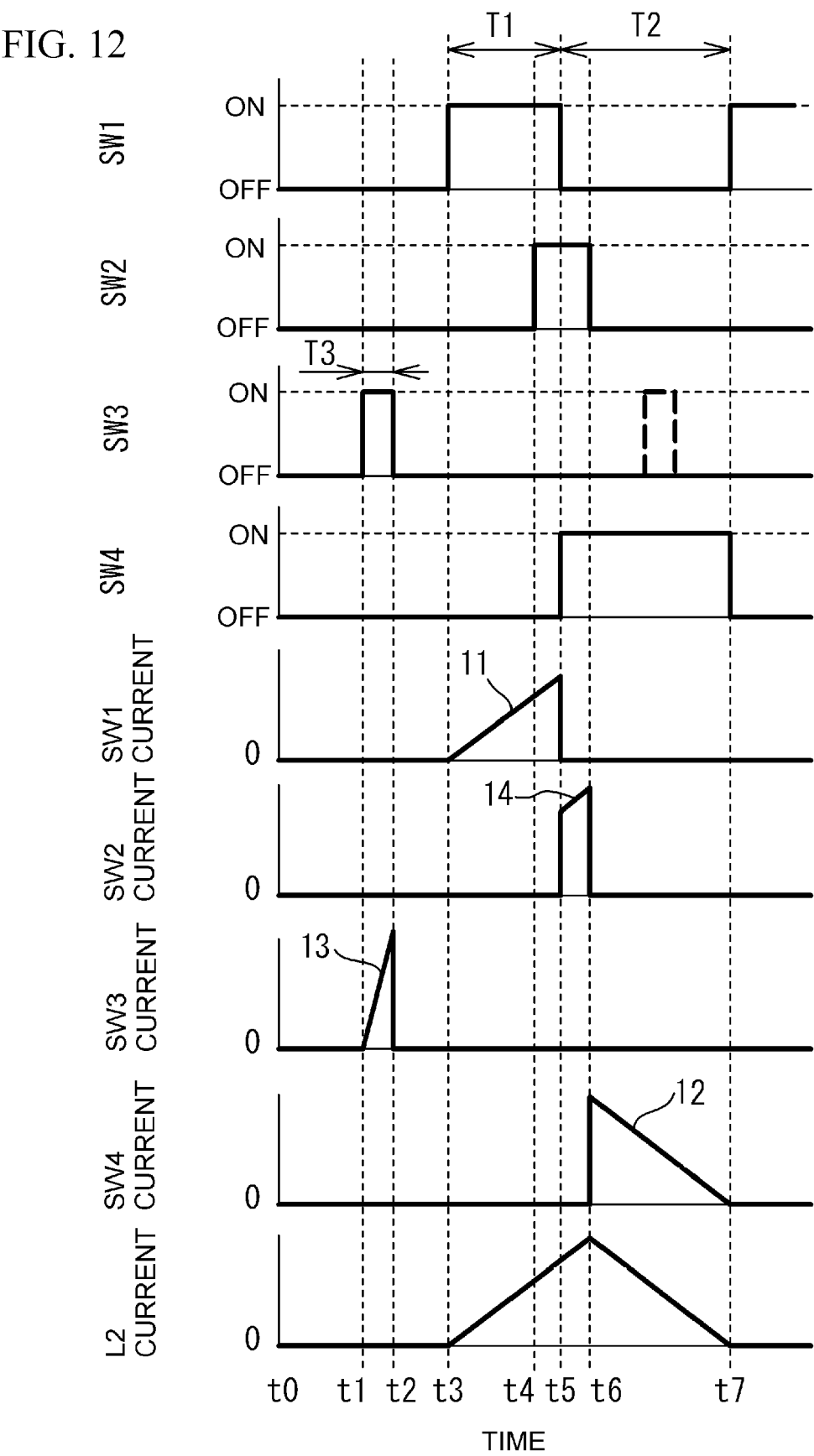
FIG. 12 is a diagram that illustrates an operation of the embodiment 1.

A description will now be given, with reference to FIGS. 11 and 12, of an operation of the switching power supply in accordance with the embodiment 1. FIG. 11 is a circuit diagram that indicates currents that flow in the switching power supply 10 in accordance with the embodiment 1, and FIG. 12 is a diagram that illustrates operations and currents of the first switch SW1 through the fourth switch SW4, and the L2 current with time. The SW2 current that flows from the node N12 to the node N11 is positive, and the SW3 current that flows from the node N31 to the node N13 is positive. The directions of the other currents are the same as those of the comparative examples 1 through 4.

Referring to FIG. 12, at time t0, the switches SW1 through SW4 are kept off, and the SW1 current through the SW4 currents and the L2 current are zero. At time t1, the third switch SW3 is turned on. As in the case of the current 13 in FIG. 13, the current 13 flows from the node N21 to the capacitor C1 through the third switch SW3 and the inductor L1, and the capacitor C1 is thus charged. As illustrated in FIG. 12, the SW3 current increases gradually due to the inductor L1. At time t2, the third switch SW3 is turned off. At time t3, the first switch SW1 is turned on, and the current 11 flows, as illustrated in FIG. 11. The second switch SW2 is turned on at an arbitrary time t4 in the period T1 during which the first switch SW1 is kept on. Since the capacitor C1 is charged beforehand, the nodes N11 and N12 have the power supply voltage VE of the DC power supply 20, and the SW2 current does not flow.

Referring to FIG. 12, at time t5, the first switch SW1 is turned off and the fourth switch SW4 is turned on. The voltage of the node N11 decreases, and the current 14 flows from the capacitor C1 via the second switch SW2. The capacitor C1 is thus charged. Referring to FIG. 12, the current rises in the same gradient as that of the current 11 when the discharge current from the capacitor C1 flows. When the discharge of the capacitor C1 is complete or at time t6 that follows the completion of the discharge, the second switch SW2 is turned off. Then, the current 12 flows as in the case of FIG. 11. At time t7, the fourth switch SW4 is turned off. The L2 current is the sum of the SW1 current, the SW2 current and the SW4 current.

As indicated by a broken line in FIG. 12, the third switch SW3 may be kept on when the fourth switch SW4 is kept on while the first switch SW1 and the second switch SW2 are kept off. The periods T1 and T2 may be alternately provided by turning on the third switch SW3 within the period when the fourth switch SW4 is kept on. That is, the first switch SW1 and the fourth switch SW4 may be alternately turned on/off. It is thus possible to reduce the switching cycle.

The control circuit is a circuit that operates the switches SW1 through SW4 as illustrated in FIG. 12, and may be formed by a logic IC in which gate allocation is programmable. Timing generation as illustrated in FIG. 12 may be implemented by a delay circuit using a clock or another delay circuit using CR.

Figure 13:
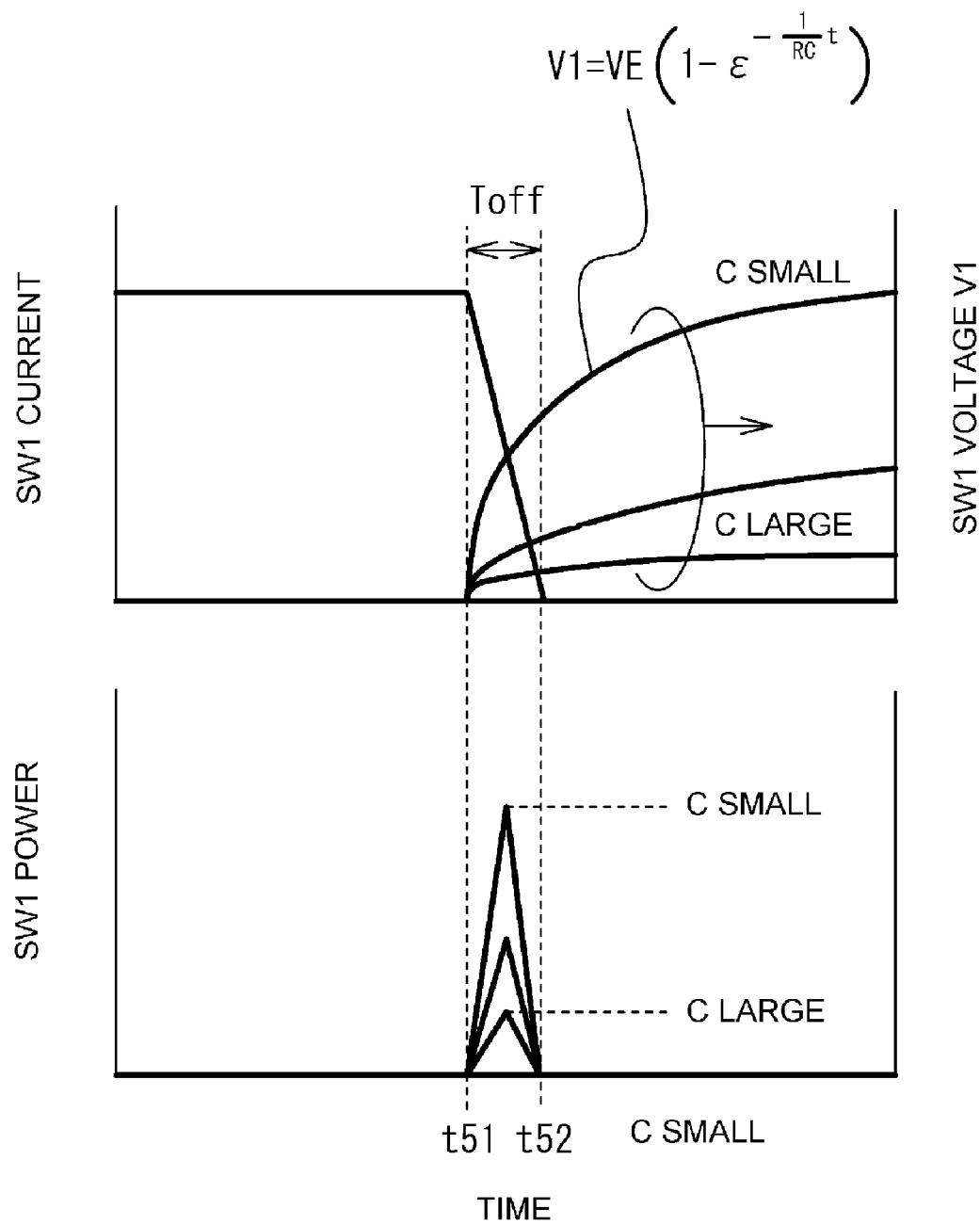
FIG. 13 is a diagram that illustrates power consumption of a first switch before and after a turn-off period in the embodiment 1.

FIG. 13 is a diagram that indicates the SW1 current, the voltage V1 across the first switch SW1 (SW1 voltage), and power consumed by the first switch SW1 (SW1 power) before and after the turn-off period Toff. The SW1 voltage V1 after then first switch SW1 is turned off is described by equation 1:

$$V1 = VE(1 - e^{(-1/RC)t})$$ (Equation 1)

where VE is the voltage of the power source E, R is the sum of the resistance value of the internal resistance R2 and the on-state resistance of the first switch SW1, and C is the capacitance value of the capacitor C1.

The SW1 voltage rises quickly as the capacitance value C of the first capacitor C1 is small, and rises slowly as the capacitance value C is large. Thus, the greater the capacitance value C, the more effectively the SW1 power is suppressed.

Figure 14:
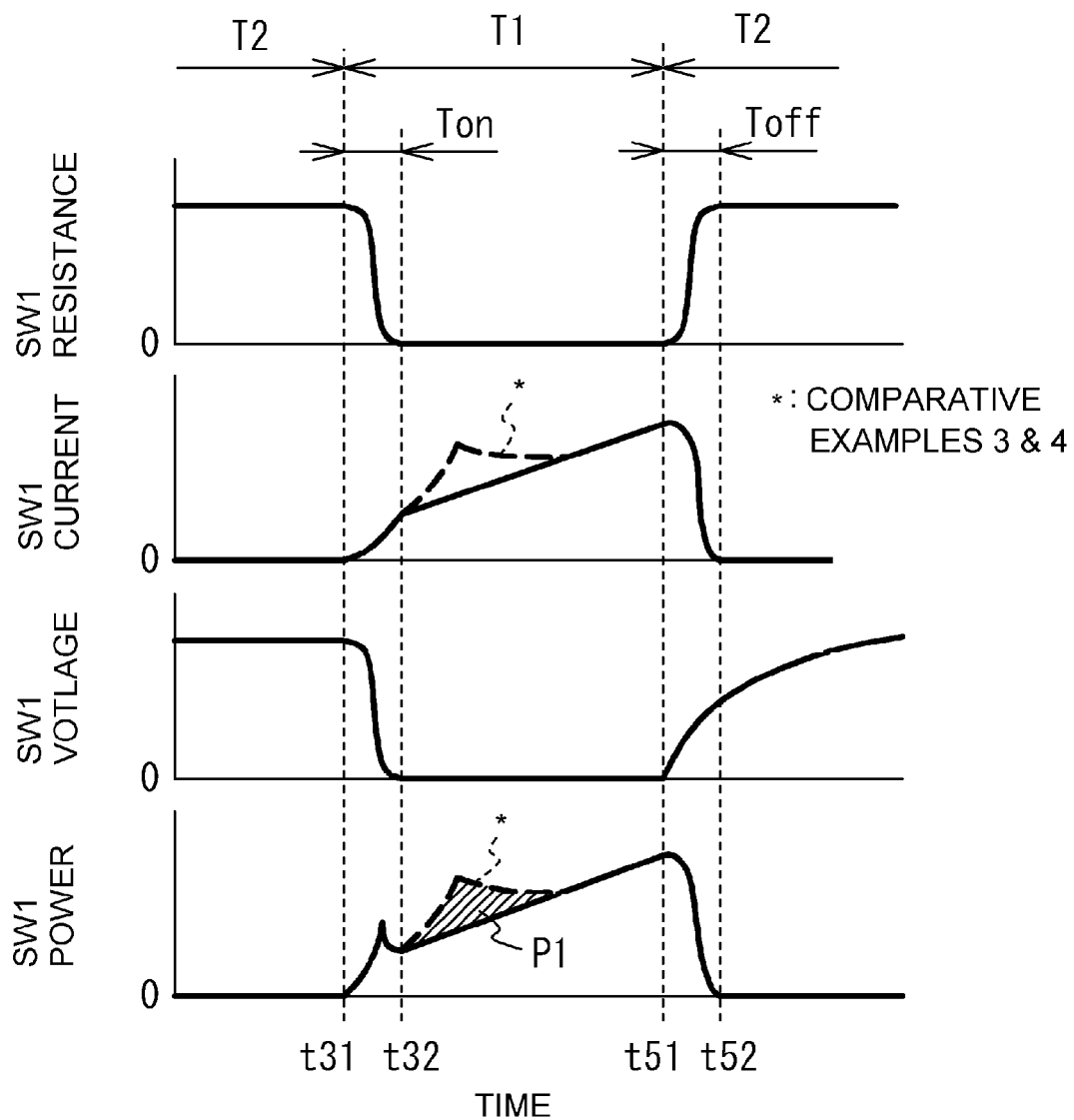
FIG. 14 is a diagram that compares power consumptions in the comparative examples 3 and 4 and power consumption of the first switch.

FIG. 14 is a diagram of power consumed in the switching power supply 10 in accordance with the embodiment 1, as compared to the comparative examples 3 and 4. There are illustrated the SW1 resistance, the SW1 current, the SW1 voltage and the SW1 power with time. Broken lines indicate the comparative examples 3 and 4, and solid lines indicate the embodiment 1. In the comparative examples 3 and 4, the capacitor C1 is charged by the current through the first switch SW1. Thus, the current that charges the capacitor C1 flows as the SW1 current during the period T1 that follows the Ton period (see the broken line in FIG. 14). Thus, the SW1 power increases. In accordance with the embodiment 1, the current 13 does not flow through the first switch SW1, and the SW1 current is smaller than that in the comparative examples 3 and 4. Thus, the SW1 power of the embodiment 1 is less than that in the comparative examples 3 and 4 by P1 in FIG. 14.

Figure 15:
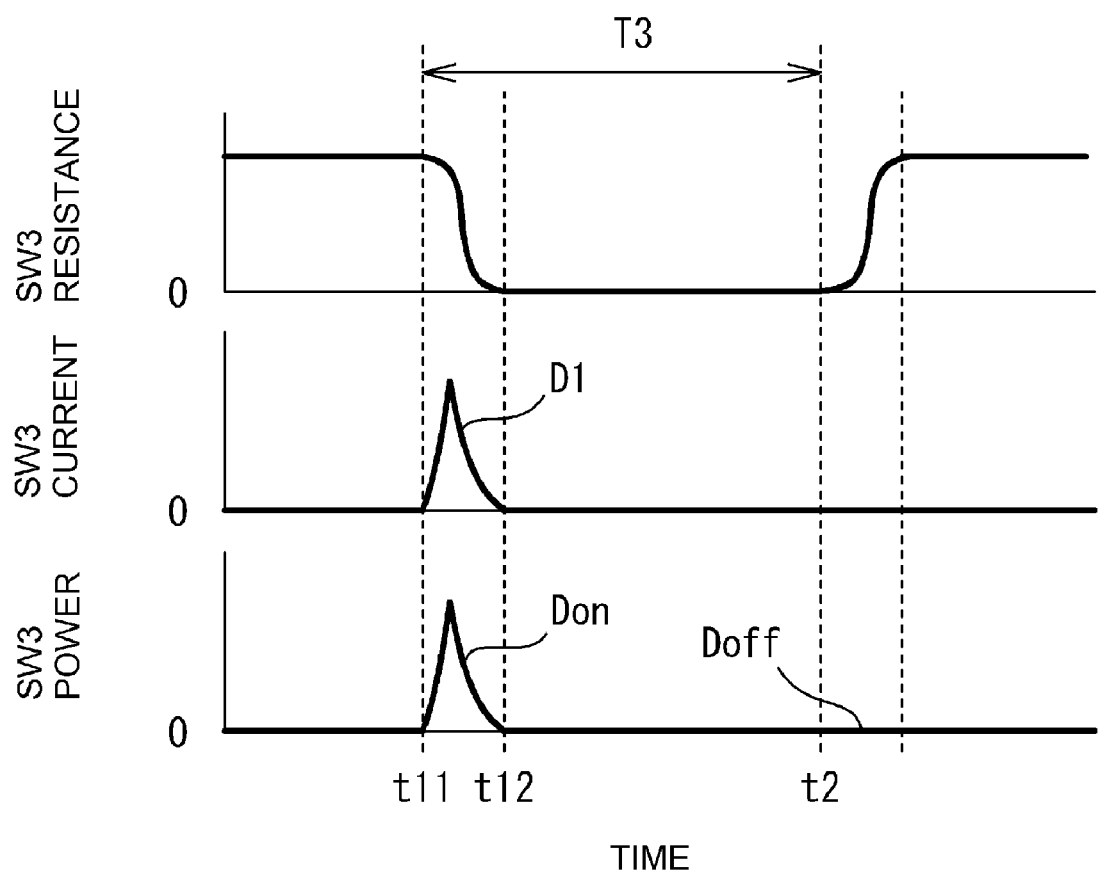
FIG. 15 is a diagram that illustrates power consumption of a comparative example 5 in which an inductor L1 and a first diode D1 are not provided.

A case will be considered as a comparative example 5 in which the inductor L1 and the first diode D1 in FIG. 10 of the embodiment 1 are omitted. FIG. 15 is a diagram of a third switch SW3 current that flows through the third switch SW3, and power consumption thereof with time. At time t11, the third switch SW3 is turned on, and the capacitor C1 is rapidly charged. Thus, the SW3 current flows abruptly between time t11 and time t12 (see D1 in FIG. 15). Thus, the SW3 power Don increases as illustrated in FIG. 15. At time t2, when the third switch SW3 is turned off, the SW3 power Doff is hardly generated.

Figure 16:
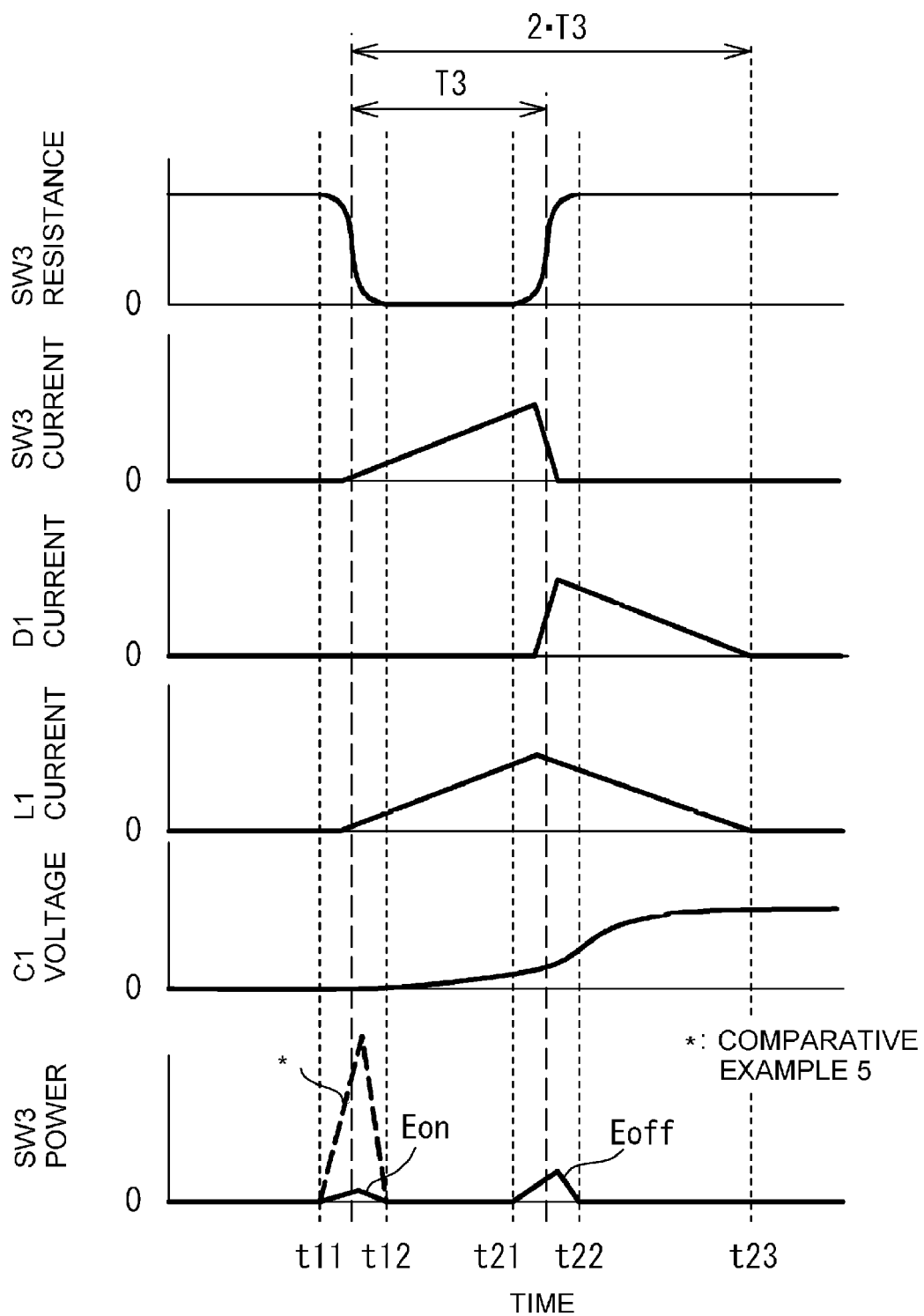
FIG. 16 is a diagram that compares power consumptions of the comparative examples 3 and 4 and power consumption of the embodiment 1.

FIG. 16 is a diagram that illustrates the SW3 resistance, the SW3 current, current that flows through the first diode D1 (D1 current), current that flows through the inductor 11 (L1 current), the C1 voltage and the SW3 power with time The D1 current that flows from the node N22 to the node N13 is positive, and the L1 current that flows from the node N13 to the node N12 is positive. A broken line of the SW3 power indicates SW3 power of the comparative example 5 that does not have the inductor L1 and the first diode D1.

At time t11, the third switch SW3 is turned on, and the L1 current and the SW3 current increase gradually due to the inductor L1. Thus, as compared to the comparative example 5 in FIG. 15, it is possible to suppress the SW3 power Eon. At time t21, the third switch SW3 is turned off, the energy stored in the inductor L1 generates the current through the first diode D1, and is released. Thus, the current that flows through the inductor L1 and the first diode D1 decreases gradually. At time t23, the current that flows through the inductor L and the first diode D1 becomes zero, and the C1 voltage becomes twice the C1 voltage obtained when the third switch SW3 is turned off. The period during which the current flows through the inductor L1 is twice the period T3, that is, 2·T3. The SW3 current that flows when the third switch SW3 is turned off is smaller than the SW3 current that flows when the third switch SW3 of the comparative example 5 is turned on. Thus, the SW3 power Eoff is small. The SW3 current that flows when the third switch SW3 is turned on does not have the charge current for the capacitor C1 indicated as D1 in FIG. 15, and the SW3 power Eon is also small. Thus, as compared to the comparative example 5 that does not have the first diode D1 and the inductor L1, the sum of the SW3 power Eon and SW3 power Eoff can be reduced.

A description will now be given of an appropriate value of the period T3 (see FIG. 12) during which the third switch SW3 is kept on. In FIG. 11, the current 13 flows through a series circuit of the inductor L1, the capacitor C1 and the DC power supply 20. In this case, the circuit equation is described by equation 2:

$$L\frac{di}{dt} + \frac{1}{C}\int_0^t i\,dt = VE \qquad \text{(Equation 2)}$$

where t is the time in which t is zero when the third switch SW3 is turned on, L is the inductance value of the inductor L1, C is the capacitance value of the capacitor C1, I is the current value of the current 13, and VE is the voltage value of the current source E.

The voltage Vc across the capacitor C1 is obtained as equation 3 by solving the equation 2:

$$Vc = VE(1 - \cos \omega \cdot t) \qquad \text{(Equation 3)}$$

When the third switch SW3 is turned off at t=T3, a capacitor C1 voltage $Vc_{(2 \cdot T3)}$ is described as equation 4:

$$Vc_{(2 \cdot T3)} = 2VE(1 - \cos \omega \cdot t) \qquad \text{(Equation 4)}$$

Thus, $$t = \sqrt{(LC)} \cos^{-1}\left[1 - \frac{Vc_{(2 \cdot T3)}}{2VE}\right] \qquad \text{(Equation 5)}$$

Time t necessary for the capacitor C1 voltage $Vc_{(2 \cdot T3)}$ to become equal to VE of the DC power supply 20 is described as equation 6:

$$t = \sqrt{(LC)}\cos^{-1}(0.5) = 0.955\sqrt{(LC)} \qquad \text{(Equation 6)}$$

Thus, the period T3 during which the third switch SW3 is kept on is defined by equation 6. However, in practice, loss due to resistance takes place, and the period T3 during which the third switch SW3 is kept on is equal to or greater than 0.955 $\sqrt{(LC)}$.

In order to suppress power consumed by the third switch SW3, it is preferable to increase the inductance L of the inductor L1 and lengthen the charge time for the capacitor C1. In the embodiment 1, after the second switch SW2 is turned off, the capacitor C1 may be charged anytime. It is thus possible to suppress the power consumed by the third switch SW3 by increasing the inductance L.

Figure 17:
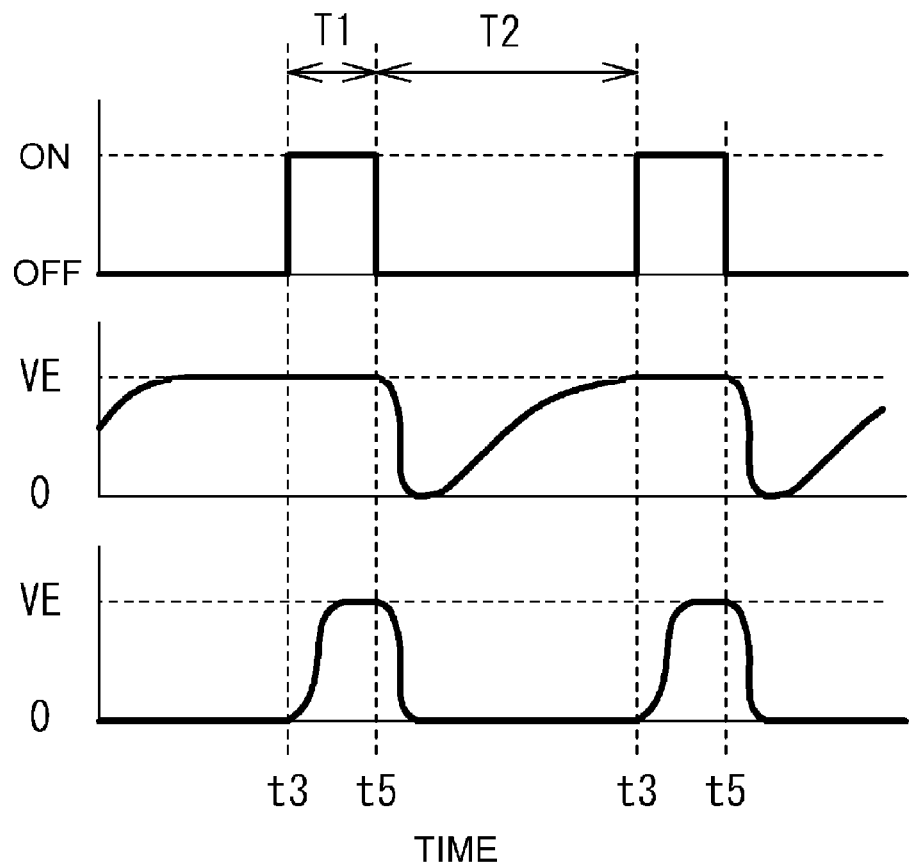
FIG. 17 is a diagram that compares power consumptions of the comparative examples 3 and 4 with power consumption of a third switch.

FIG. 17 is a diagram that illustrates effects of suppression of power consumption by the third switch SW3 in accordance with the embodiment 1, and illustrates an operation of the first switch SW1, the C1 voltage in the embodiment 1, and the C1 voltage in the comparative examples 3 and 4. In the comparative examples 3 and 4, the capacitor C1 is charged during only the period T1 when the first switch SW1 is kept on. When the first switch SW1 has a small duty ratio, the capacitor C1 may be charged quickly. Thus, power consumed by the first switch SW1 increases. In contrast, according to the embodiment 1, the aforementioned second switch SW2 is turned off, so that the capacitor C1 is charged except the transient period around time t5 when the first switch SW1 is turned off. It is thus possible to charge the capacitor C1 during almost the periods T1 and T2. Thus, even in a case where the first switch SW1 has a small duty ratio, the capacitor C1 may be charged for a long time, and power consumed by the first switch SW1 may be suppressed.

According to the embodiment 1, as illustrated in FIG. 10, the switch SW1 is provided between the node N1 that is one end of the DC power supply 20 and the node N31 that is one end of the load 30. The second switch SW2 is provided between the node N11 located on the load 30 side of the first switch SW1 and the node N22 that is the other end of the DC power supply 20. The third switch SW3 is provided between the node N21 located on the DC power supply 20 side of the first switch SW1 and the node N12. The capacitor C1 is provided between the second switch SW2 and the node N22. The inductor L1 is provided between the third switch SW3 and the node N12 between the second switch SW2 and the capacitor C1 so that the node N13 side is provided as the cathode.

The capacitor C1 is connected to the node N31 via the inductor L1 and the third switch SW3. Thus, as illustrated in FIG. 14, the capacitor C1 may be charged without interposing the first switch SW1. Thus, it is possible to avoid the power consumption by the first switch SW1 at the time of charging the capacitor C1. Since the inductor L1 and the first diode D1 are provided, as illustrated in FIG. 16, it is possible to reduce the power consumed by the third switch SW3. Since the second switch SW2 is provided, as illustrated in FIG. 17, it is possible to charge the capacitor C for a longer time. Thus, even when the first switch SW1 has a small duty ratio, it is possible to suppress power consumed by the first switch SW1.

In the embodiment 1, as illustrated in FIG. 16, the inductor L1 may be a delay circuit that delays the C1 current for charging the capacitor C1. For example, the delay circuit may be formed by a resistor. However, the use of resistor for the delay circuit may lose power. Thus, it is preferable that the delay circuit may be an inductor as in the case of the embodiment 1.

As illustrated in FIG. 12, the control circuit 40 turns on the second switch SW2 in the period during which the control circuit 40 keeps the first switch SW1 on. Thus, when the first switch SW1 is turned off, the charge stored in the capacitor C1 may be released. The control circuit 40 turns on the third switch SW3 in the period during which the control circuit 40 keeps the second switch SW2 off. Thus, the capacitor C1 may be discharged between the period during which the nodes N12 and N11 are cut off.

As illustrated in FIG. 12, the control circuit 40 turns on/off the third switch SW3 during the period T2 during which the control circuit 40 keeps the first switch SW1 off. Thus, the capacitor C1 may be charged without interposing the first switch SW1.

As illustrated in FIG. 10, the fourth switch is provided between the nodes N11 and N22. As illustrated in FIG. 12, the control circuit 40 turns on the fourth switch SW4 in the period during which the control circuit 40 keeps the first switch SW1 off. Thus, the current 12 in FIG. 11 is allowed to flow. As illustrated in FIG. 12, the second switch SW2 is turned off in the period T2 during which the fourth switch SW4 is kept on. Thus, after the discharge of the capacitor C1 is complete, the current 12 depicted in FIG. 11 may be supplied to the inductor L2.

As illustrated in FIG. 12, the control circuit 40 turns on/off the third switch SW3 in the period T2 during which the control circuit 40 keeps the fourth switch SW4 on. It is thus possible to alternately turn on and off the first switch SW1 and the fourth switch SW4.

Embodiment 2

Figure 18:
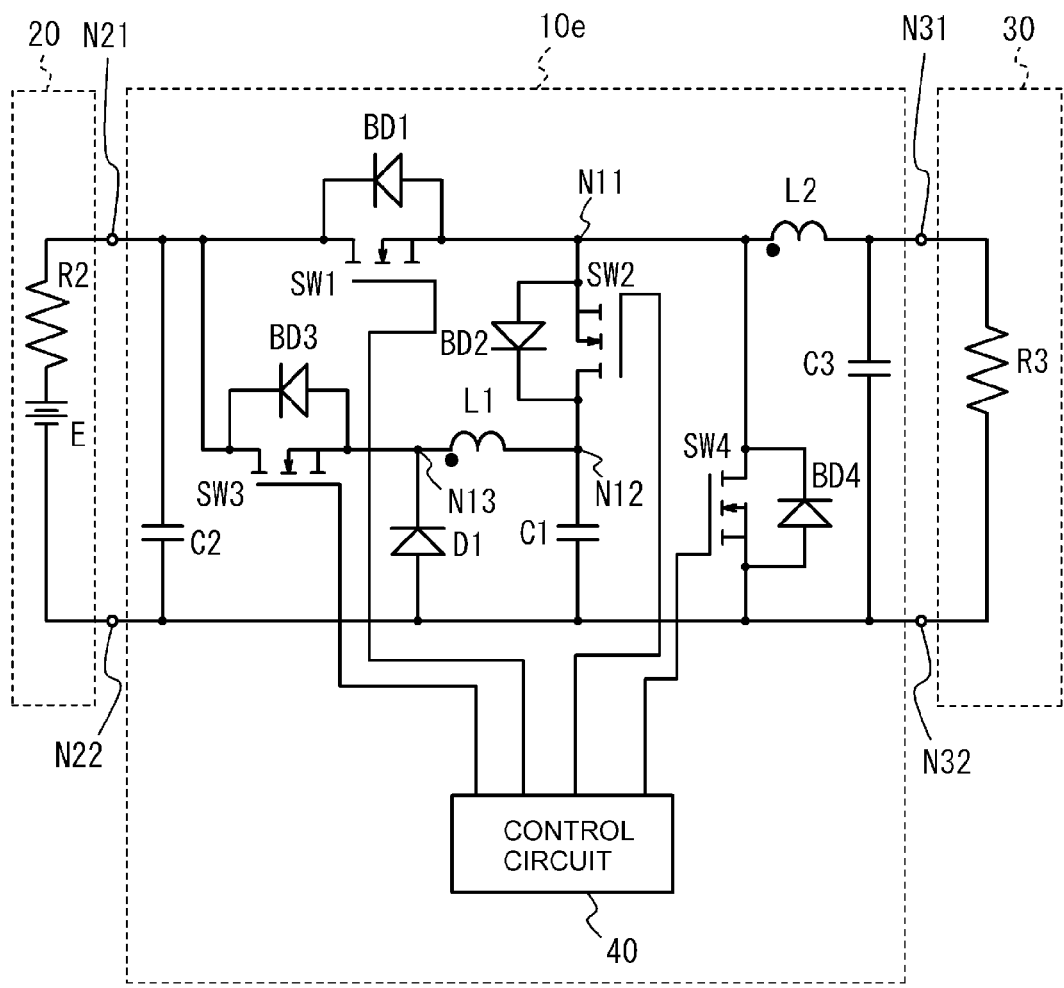
FIG. 18 is a circuit diagram of a switching power supply in accordance with an embodiment 2.

An embodiment 2 is an exemplary configuration in which the switches SW1 through SW4 are formed by MOSFETs. FIG. 18 is a circuit diagram of the embodiment 2. Referring to FIG. 18, a switching power supply 10e in accordance with the embodiment 2 uses MOSFETs to form the switches SW1 through SW4. The other structures are the same as those of the embodiment 1, and a description thereof is omitted. In the embodiment 2, the node N21 is connected to the positive terminal of the DC power supply 20, and the node N22 is connected to the negative terminal of the DC power supply 20. That is, one end of the DC power supply 20 is the positive terminal. In this case, a body diode BD1 of the first switch SW1 is connected so that the cathode is located on the DC power supply 20 side, and a body diode BD2 of the second switch SW2 is connected so that the anode is located on the node N11 side. A body diode BD3 of the third switch SW3 is connected so that the cathode is located on the node N21 side, and a body diode BD4 of the fourth switch SW4 is connected so that the cathode is located on the node N11 side. Thus, the switches SW1 through SW4 may reliably cut off the currents 11 through 14.

Preferably, the control circuit 40 and the switches SW1 through SW4 are integrated.

In the embodiment 2, power consumption was simulated. The simulator was Simetrix5.3, and the switching frequency was set to 1000 kHz. In simulation of the embodiment 2, the first switch SW1 through SW3 were IRFU3711Z, and the fourth switch SW4 was IRF9410. The diodes D1 and D2 were MBR20100. The capacitors C1, C2 and C3 had capacitance values of 50 nF, 560 μF and 560 μF, respectively, and the inductors L1 and L2 had inductance values of 1 μH and 50 nH, respectively.

In the simulation of the comparative example 1, the first switch SW1 and the fourth switch SW4 was IRFU3711Z, and the diode was MBR20100. The capacitors C2 and C3 had capacitance values of 560 μF, and the inductor L2 had an inductance of 50 nH.

Figure 19:
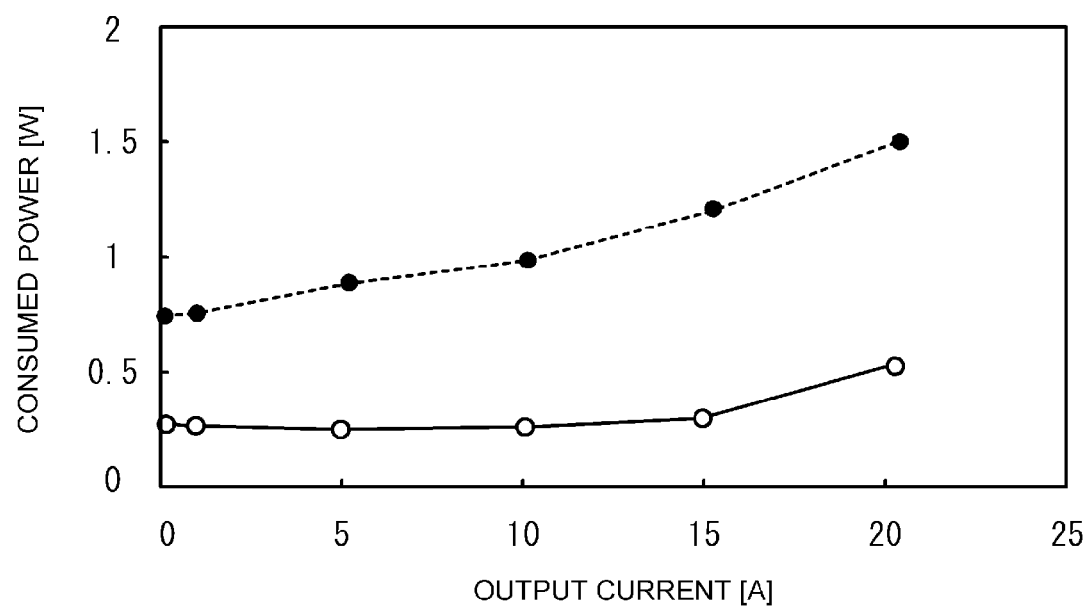
FIG. 19 is a diagram (part 1) that illustrates simulation results of the embodiment 2.

FIG. 19 is a diagram that illustrates the sum of the MOSFETs that form the switch SW1 through SW4 with respect to the output current in the comparative example 1 and the embodiment 2. Filled circles are simulation results of the comparative example 1, and open circles are those of the embodiment 2. A broken line and a solid line are lines obtained by connecting the simulation results of the comparative example 1 and the embodiment 2, respectively. Referring to FIG. 19, the embodiment 2 may suppress power consumed by the MOSFETs, as compared to the comparative example 1.

Figure 20:
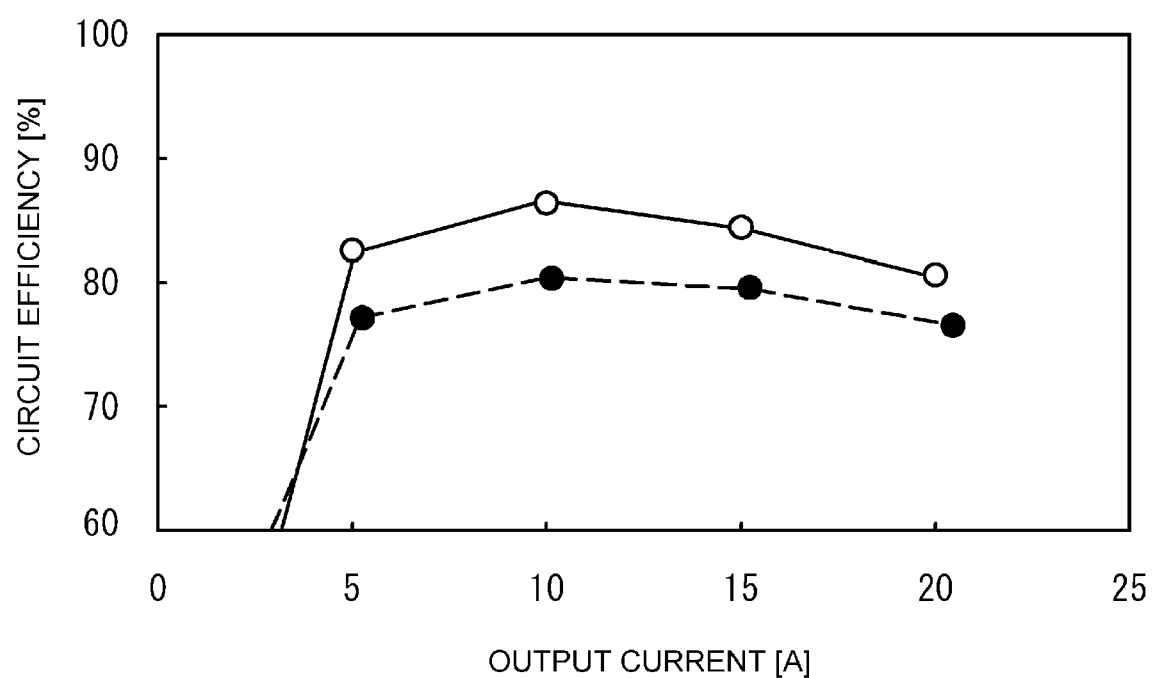
FIG. 20 is a diagram (part 2) that illustrates simulation results of the embodiment 2.

FIG. 20 is a diagram that illustrates circuit efficiency of the switching power supply with respect to the output current in the comparative example 1 and the embodiment 2. Filled circles are simulation results of the comparative example 1, and open circles are those of the embodiment 2. A broken line and a solid line are lines obtained by connecting the simulation results of the comparative example 1 and the embodiment 2, respectively. Referring to FIG. 20, the embodiment 2 may improve the circuit efficiency by 3% to 5%, as compared to the comparative example 1.

Embodiment 3

Figure 21:
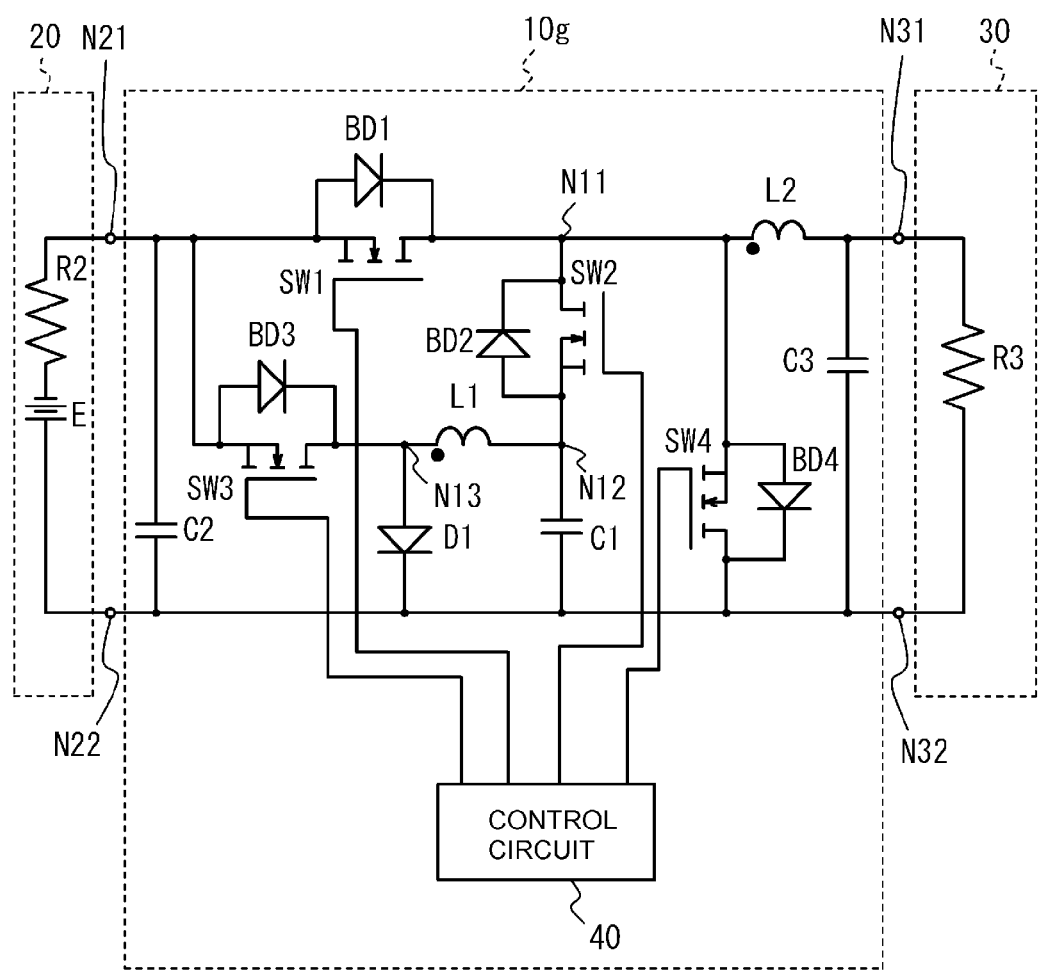
FIG. 21 is a circuit diagram of a switching power supply in accordance with an embodiment 3.

An embodiment 3 is an exemplary configuration in which the polarity of the DC power supply used in the embodiment 2 is inverted. FIG. 21 is a circuit diagram of the embodiment 3. Referring to FIG. 21, a switching power supply 10f in accordance with the third embodiment is configured so that the directions of the body diodes BD1 through BD4 of the switches SW1 through SW4 and the first diode D1 are opposite to those in the embodiment 2 in FIG. 18. The other structures are the same as those of the embodiment 1 in FIG. 10 and a description thereof is omitted. In the embodiment 3, the node 21 is connected to the negative terminal of the DC power supply 20, and the node N22 is connected to the positive terminal of the DC power supply 20. That is, one end of the DC power supply 20 is the negative terminal. In this case, the body diode BD1 of the first switch SW1 is connected so that the anode is located on the DC power supply 20 side, and the body diode BD2 of the second switch SW2 is connected so that the cathode is located on the node N11 side. The body diode BD3 of the third switch SW3 is connected so that the anode is located on the node N21 side, and the body diode BD4 of the fourth switch SW4 is connected so that the anode is located on the node N11 side. The first diode D1 is connected so that the anode is locate on the node N13 side.

As in the case of the embodiment 3, by inverting the polarity of the DC power supply, the currents 11 through 14 flow in the directions opposite to those illustrated in FIG. 11. Thus, the embodiment 3 is configured by inverting the directions of the body diodes BD1 through BD4 of the switches SW1 through SW4 and the first diode D1 of the embodiment 2 illustrated in FIG. 18.

Embodiment 4

Figure 22:
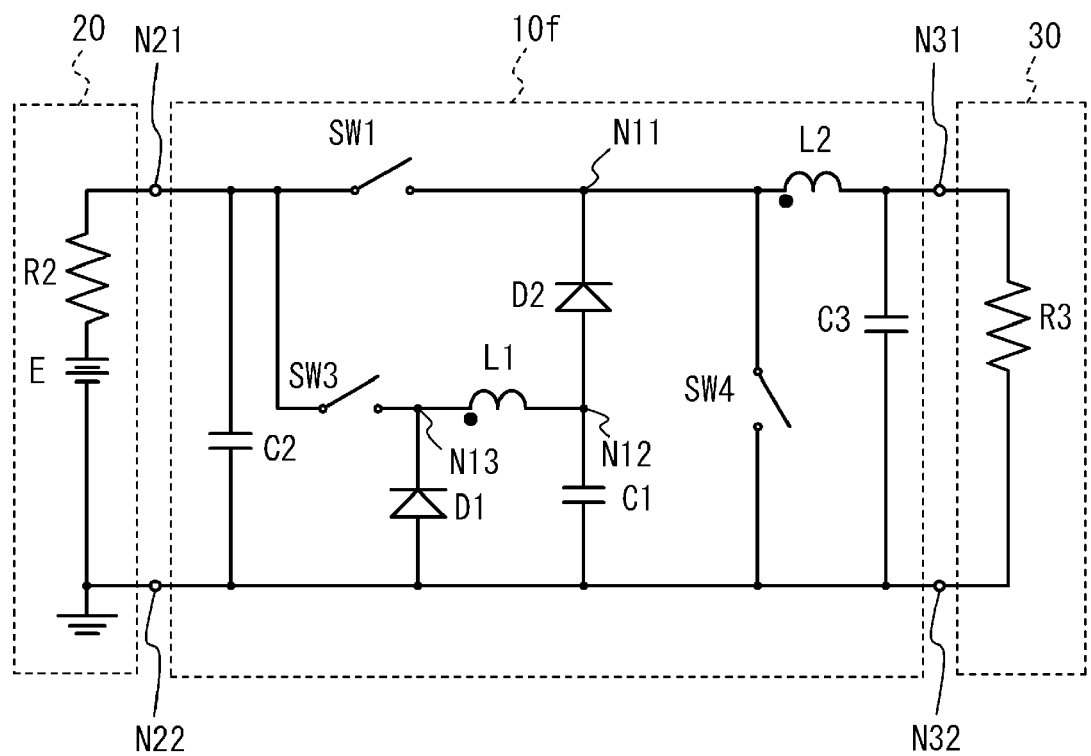
FIG. 22 is a circuit diagram of a switching power supply in accordance with an embodiment 4.

An embodiment 4 is an exemplary configuration in which a diode is used as the second switch SW2. FIG. 22 is a circuit diagram of the embodiment 4. Referring to FIG. 22, a switching power supply 10g in accordance with the embodiment 4 is configured so that the second switch SW2 used in the embodiment 1 in FIG. 11 is formed by a second diode D2. The cathode of the second diode D2 is located on the node N11 side, and the anode thereof is located on the node N12 side.

Thus, the second diode D2 functions as the second switch that allows the current 13 to flow when the node N11 has a negative voltage with respect to the node N12 and cuts off the current 13 when the node N11 has a positive voltage with respect to the node N12. Thus, the third switch SW3 is turned on in the period T1 in which the first switch SW1 is kept on so that the capacitor C1 is charged. When the first switch SW1 is turned off, current flows from the capacitor C1 to the inductor L2 via the second diode D2, so that the capacitor C1 is discharged. When the period T1 has a length enough to charge the capacitor C1, the second diode D2 may be used as the second switch SW2. Thus, the configuration of the control circuit 40 may be simplified.

In a case where the node N21 is connected to the negative terminal of the DC power supply 20, the second diode D2 is connected so that the anode is located on the node N11 side, and the cathode is located on the node N12 side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A switching power supply comprising:
    a first switch provided between one end of a DC power supply and one end of a load;
    a second switch provided between a node of the first switch located on a load side and another end of the DC power supply;
    a capacitor provided between the second switch and the another end of the DC power supply;
    a third switch provided between a node of the first switch located on a DC power supply side and a node between the second switch and the capacitor; and
    a delay circuit that is provided between the third switch and the node between the second switch and the capacitor and delays a current for charging the capacitor,
    wherein the second switch is turned on in a period during which the first switch is kept on.

2. The switching power supply according to claim 1, further comprising a control circuit that turns on the second switch in a period during which the control circuit keeps the first switch on, and
    turns on/off the third switch in a period during which the control circuit keeps the second switch off.

3. The switching power supply according to claim 2, wherein the control circuit turns on/off the third switch in the period during which the control circuit keeps the first switch off.

4. The switching power supply according to claim 2, further comprising a fourth switch provided between the node of the first switch located on the load side and the another terminal of the DC power supply,
    wherein the control circuit turns on the fourth switch in the period during which the control circuit keeps the first switch off, and turns off the second switch in the period during which the control circuit keeps the fourth switch on.

5. The switching power supply according to claim 4, wherein the control circuit turns on/off the third switch in the period during which the control circuit keeps the fourth switch on.

6. The switching power supply according to claim 1, further comprising a first diode provided between a node between the third switch and the delay circuit and the another terminal of the DC power supply,
    wherein the first diode is connected so that a cathode of the first diode is located on a node side at which the node between the third switch and the delay circuit in a case where the one end of the DC power supply is a positive terminal, and an anode thereof is located on a node side at which the node between the third switch and the delay circuit is provided in a case where the one end of the DC power supply is a negative terminal.

7. The switching power supply according to claim 6, wherein the period during which the third switch is turned on/off is equal to or greater than $0.955\sqrt{\sqrt{V(LC)}}$ where L is an inductance value of the inductor, and C is a capacitance value of the capacitor.

8. The switching power supply according to claim 1, wherein the second switch is a second diode and that the node of the first switch on the load side is a cathode of the second diode in a case where the one end of the DC power supply is a positive terminal and the node of the first switch on the load side is an anode of the second diode in a case where the one end of the DC power supply is a negative terminal.

9. The switching power supply according to claim 1, wherein the first switch, the second switch and the third switches are MOSFETs:
- in a case where the one end of the DC power supply is a positive terminal, a body diode of the first switch is connected so that a cathode thereof is located on the DC power supply side, a body diode of the second switch is connected so that an anode thereof is located on the node of the first switch on the load side, and a body diode of the third switch is connected so that a cathode thereof is connected to a one-end side of the DC power supply; and
- in a case where the one end of the DC power supply is a negative terminal, the body diode of the first switch is connected so that an anode thereof is located on the DC power supply side, the body diode of the second switch is connected so that a cathode thereof is located on the node of the first switch on the load side, and the body diode of the third switch is connected so that an anode thereof is connected to the one-end side of the DC power supply.

10. A method for controlling a switching power supply including:
- a first switch provided between one end of a DC power supply and one end of a load;
- a second switch provided between a node of the first switch on a load side and another end of the DC power supply;
- a capacitor provided between the second switch and the another end of the DC power supply; and
- a third switch provided between the node of the first switch on a DC power supply side and a node between the second switch and the capacitor;
- a delay circuit that is provided between the third switch and a node between the second switch and the capacitor and delays a current for charging the capacitor,
- wherein the second switch is turned on in a period during which the first switch is kept on, the method comprising the steps of:
- turning on the second switch in a period during which the first switch is kept on; and
- turning on the third switch in a period during which the second switch is kept off.

11. A control circuit for controlling a switching power supply including:
- a first switch provided between one end of a DC power supply and one end of a load;
- a second switch provided between a node of the first switch on a load side and another end of the DC power supply;
- a capacitor provided between the second switch and the another end of the DC power supply; and
- a third switch provided between the node of the first switch on a DC power supply side and a node between the second switch and the capacitor;
- a delay circuit that is provided between the third switch and a node between the second switch and the capacitor and delays a current for charging the capacitor,
- wherein the second switch is turned on in a period during which the first switch is kept on, the control circuit comprising:
- turning on the second switch in a period during which the control circuit keeps the first switch on; and
- turning off the third switch in a period during which the control circuit keeps the second switch off.

* * * * *

UNITED STATES PATENT AND TRADEMARK OFFICE
CERTIFICATE OF CORRECTION

PATENT NO. : 7,880,450 B2  Page 1 of 1
APPLICATION NO. : 12/777711
DATED : February 1, 2011
INVENTOR(S) : Yu Yonezawa et al.

It is certified that error appears in the above-identified patent and that said Letters Patent is hereby corrected as shown below:

Column 12, Line 58 in Claim 7, delete " $0.955\sqrt{\sqrt{(LC)}}$ ," and insert -- $0.955\sqrt{(LC)}$ --, therefor.

Signed and Sealed this
Nineteenth Day of April, 2011

David J. Kappos
*Director of the United States Patent and Trademark Office*